United States Patent
Fiscus et al.

(10) Patent No.: US 8,067,501 B2
(45) Date of Patent: Nov. 29, 2011

(54) PROPYLENE-BASED BLOWN FILMS WITH IMPROVED PERFORMANCE, STABILITY AND ELASTIC PROPERTIES COMPARED TO POLYETHYLENE FILMS

(75) Inventors: David Michael Fiscus, Houston, TX (US); Narayanaswami Raja Dharmarajan, Houston, TX (US); Michael Charles Bulawa, Houston, TX (US); Michael Glenn Williams, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 57 days.

(21) Appl. No.: 12/644,252

(22) Filed: Dec. 22, 2009

(65) Prior Publication Data

US 2010/0215933 A1    Aug. 26, 2010

Related U.S. Application Data

(60) Provisional application No. 61/155,748, filed on Feb. 26, 2009.

(51) Int. Cl.
  *C08F 8/00*    (2006.01)
  *C08L 23/04*   (2006.01)
  *C08L 23/10*   (2006.01)
  *C08L 9/00*    (2006.01)

(52) U.S. Cl. .................. 525/191; 525/232; 525/240
(58) Field of Classification Search .................. 525/191, 525/232, 240
  See application file for complete search history.

(56) References Cited

U.S. PATENT DOCUMENTS

| | | |
|---|---|---|
| 3,753,769 A | 8/1973 | Steiner |
| 4,058,645 A | 11/1977 | Steiner |
| 4,214,039 A | 7/1980 | Steiner et al. |
| 4,368,565 A | 1/1983 | Schwarz |
| 4,439,493 A | 3/1984 | Hein et al. |
| 4,447,494 A | 5/1984 | Wagner, Jr. et al. |
| 4,961,992 A | 10/1990 | Balloni et al. |
| 5,019,447 A | 5/1991 | Keller |
| 5,057,177 A | 10/1991 | Balloni et al. |
| 5,063,264 A | 11/1991 | Nakajima |
| 5,230,963 A | 7/1993 | Knoerzer |
| 5,667,902 A | 9/1997 | Brew et al. |
| 6,368,545 B1 | 4/2002 | Bailey et al. |
| 7,122,601 B2 * | 10/2006 | Musgrave et al. ............ 525/191 |
| 2005/0037219 A1 | 2/2005 | Ohlsson et al. |
| 2006/0159943 A1 | 7/2006 | Brant et al. |
| 2007/0160860 A1 | 7/2007 | Fiscus et al. |

OTHER PUBLICATIONS

Koenig et al., "Integrated Infrared Band Intensity Measurement of Stereoregularity in Polypropylene," Journal of Applied Polymer Science, vol. 9, Issue 1 (1965), pp. 359-367.

* cited by examiner

*Primary Examiner* — Nathan M Nutter

(57) ABSTRACT

A thermoplastic composition for cast and blown films and the resulting films thereof are provided. The film can include about 10 wt % to 80 wt % propylene-based copolymer having at least 50 wt % propylene-derived units and 5 wt % to 30 wt % alpha-olefin comonomer, based on the total weight of the polymer that exhibits a melting point of about 100° C. to 170° C., and a MFR of about 200 dg/min or less. The film can include about 20 wt % to 90 wt % polypropylene homopolymer having a melting point of about 140° C. to 190° C. The film can have a thickness of about 10 μm to 100 μm, a haze of 13% or less, a 1% MD Secant tensile modulus of 55,000 to 150,000 psi, a machine direction Elmendorf tear of at least 5 g/mil and a transverse direction Elemdorf tear of at least 300 g/mil, and a 45 degree gloss of at least 70.

11 Claims, 4 Drawing Sheets

PROPYLENE-BASED BLOWN FILMS WITH IMPROVED PERFORMANCE, STABILITY AND ELASTIC PROPERTIES COMPARED TO POLYETHYLENE FILMS

CROSS REFERENCE TO RELATED APPLICATION

This application claims priority to U.S. Provisional Patent Application No. 61/155,748 filed Feb. 26, 2009, the disclosure of which is incorporated herein by reference in its entirety.

FIELD OF THE INVENTION

Embodiments of the present invention generally relate to thermoplastic compositions for blown films and blown films and articles made therefrom.

BACKGROUND OF THE INVENTION

Plastic sacks that can be used in packaging materials heated to temperatures between 180° F. (82° C.) and 260° F. (126° C.), such as cement, sand, and salt, have gained recent interest. Such intended uses have become known as "hot fill applications". As of the end of 2006, the global market for plastic sacks in hot fill applications has been thought to exceed 20 million pounds per year of bags.

Heavy-duty sacks for cold fill applications are known. See, for example, U.S. Publication No. 2005/0037219 and U.S. Pat. No. 6,368,545. However, such cold fill applications are designed for products that are packaged at temperatures less than 180° F. (82° C.), typically lawn-and-garden products, consumer goods and chemicals. Conventional sacks for such cold fill applications typically include coextruded films made with a metallocene catalyzed polyethylene resin in the skins, a high density polyethylene (HDPE) resin in the core and a low density polyethylene (LDPE) resin throughout the entire structure. This solution is not suitable for hot fill applications because polyethylene resins melt at much lower temperatures, around 255° F. (124° C.), than those encountered in hot fill applications.

Homopolymer polypropylene (PP) resins can provide hot fill capability because such resins melt at 329° F. (165° C.). However, sacks made using homopolymer polypropylene resins have suffered from production deficits because of poor melt strength and delamination problems.

In addition, the poor melt strength of homopolymer PP film resins restricts using these PP resins to such non-film applications as injection molding applications that do not require melt strength, and prevents using homopolymer PP resins in non-film applications requiring melt strength such as blow molding applications without (1) increasing the PP resin's molecular weight, (2) incorporating ethylene into the resin to make copolymer PP resins, (3) incorporating EP rubbers into the PP resins to make EP-PP blends, or (4) incorporating highly branched resins into the PP resins, such as LDPE resin, to make PP blends.

There is a need, therefore, for monolayer and coextruded films employing blends of polypropylene resins to overcome the aforementioned limitations of conventional films.

SUMMARY OF THE INVENTION

A thermoplastic composition for cast and blown films as well as the resulting films thereof are provided. In at least one specific embodiment, the film includes about 10 wt % to about 80 wt % of a propylene-based copolymer having at least 50 wt % propylene-derived units and 5 wt % to 30 wt % alpha-olefin comonomer, based on the total weight of the polymer. The copolymer has a melting point of from about 100° C. to about 170° C., and a melt flow rate of about 200 dg/min or less, as measured according to ASTM D1238-94. The film can also include about 20 wt % to about 90 wt % of a polypropylene homopolymer having a melting point of from about 140° C. to about 190° C. Preferably, the film has a thickness of about 10 μm to about 100 μm, a haze of 13% or less, as measured according to ASTM D1003-95, a 1% MD Secant tensile modulus of 55,000 to 150,000 psi, as measured according to ASTM D882-95a, an Elmendorf tear in the machine direction of at least 5 g/mil, as measured according to ASTM D1922-94, an Elmendorf tear in the transverse direction of at least 300 g/mil, as measured according to ASTM D1922-94, and a 45 degree gloss of at least 70, as measured according to ASTM D2457-90.

In at least one specific embodiment, the thermoplastic composition includes about 10 wt % to about 90 wt % of a propylene-based copolymer having at least 50 wt % propylene-derived units and of from 5 wt % to 25 wt % ethylene, based on the total weight of the copolymer. The copolymer has a melt flow rate of about 7 g/10 min to 8 g/10 min (ASTM 1238D, 2.16 kg, 230° C.), a density of about 0.850 g/cm3 to about 0.880 g/cm3, a heat of fusion of about 21.4 J/g to about 28.8 J/g, and a melting point of about 56° C. to about 65° C. The thermoplastic composition further includes about 20 wt % to about 90 wt % of a polypropylene homopolymer having a melt flow rate of about 2.9 g/10 min to 4.5 g/10 min (2.16 kg, 230° C.), a density of about 0.920 to about 0.970 g/cm3, and a melting point of about 120° C. to about 170° C.

DESCRIPTION OF THE DRAWINGS

So that the recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
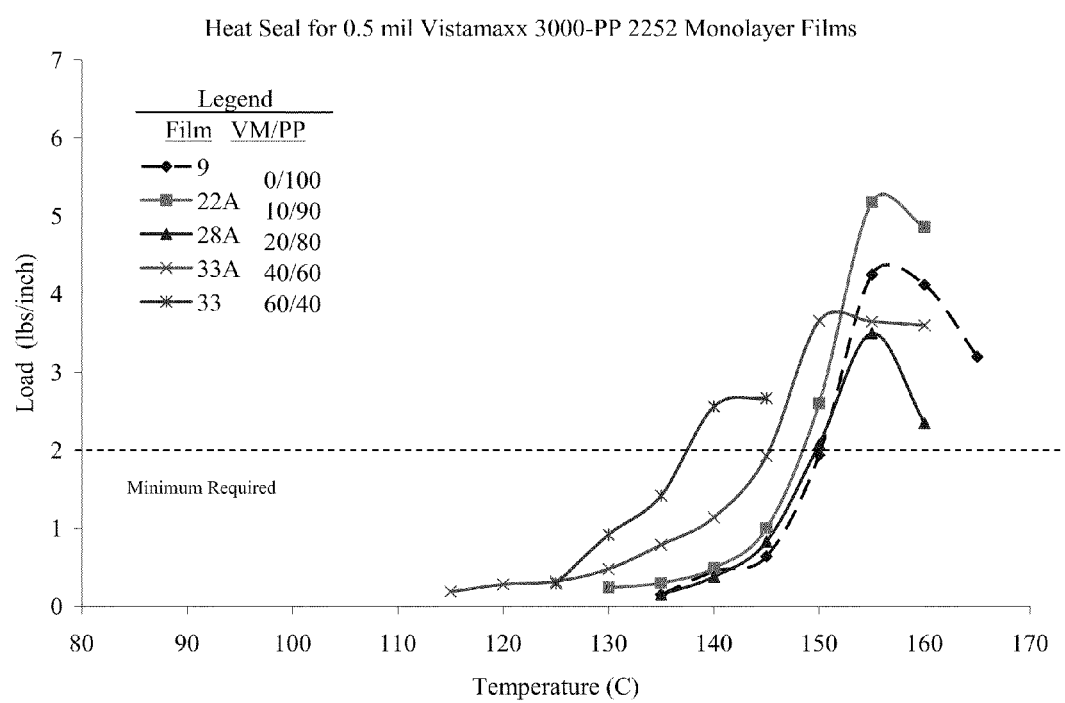
FIG. 1 depicts the heat seal performance of illustrative 0.5 mil monolayer VISTAMAXX 3000/PP 2252 cast films, according to one or more embodiments described.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Polyolefin compositions, fabricated parts such as films, and end use applications of those fabricated parts, particularly in Stretch Hooder Applications, Hot Fill Applications, Stand-Up Pouch Applications, Retort Applications and Press-and-Seal Applications are provided. Surprisingly, the films of the present invention provide a significant improvement in toughness, feel, stretch capabilities, reblock, optical, clarity and sealability. Even more surprising, these films reversibly adhere together when placed under pressure. The film can be a monolayer film or a multi-layer film of two or more layers where each layer can be the same or different.

Moreover, the films of the present invention provide a great balance of properties without the use of plasticizers or oils. More particularly, the films provide excellent reblock and Coefficient of Friction (COF) without having to resort to adding plasticizers or oils to the formulation. Not having to use plasticizers or oils means that all of the blending operations can occur at the hopper of the film line, without need for a masterbatch. Such simplification makes film production easier and more cost effective.

At least one layer, and in some embodiments each layer of the film, can include one or more polyolefins selected from the group consisting of butylene polymer, ethylene polymer, high density polyethylene (HDPE) polymer, medium density polyethylene (MDPE) polymer, low density polyethylene (LDPE) polymer, propylene (PP) polymer, isotactic polypropylene (iPP) polymer, high crystallinity polypropylene (HCPP) polymer, ethylene-propylene (EP) copolymers, ethylene-propylene-butylene (EPB) terpolymers, propylene-butylene (PB) copolymer, an ethylene elastomer, ethylene-based plastomer, propylene-based copolymer, propylene elastomer and combinations or blends thereof.

As used herein, the term "elastomer" refers to an ethylene-based or propylene-based copolymer that can be extended or stretched with force by at least 100% of its original length (i.e., twice its original length), and upon removal of the force, rapidly (e.g., within 5 seconds) returns to its approximate original dimensions.

As used herein, an "ethylene-based plastomer" refers to an ethylene-based copolymer having a density in the range of 0.850 to 0.920 $g/cm^3$, preferably in the range 0.86 to 0.90 $g/cm^3$, and a Differential Scanning Calorimetry (DSC) melting point of greater than or equal to 40° C.

As used herein, the term "stereoregular" refers to a predominant number, e.g., greater than 80%, of the propylene residues in the polypropylene or in the polypropylene continuous phase of a blend, such as impact copolymer exclusive of any other monomer such as ethylene, has the same 1,2 insertion and the stereochemical orientation of the pendant methyl group can be the same, either meso or racemic.

Propylene-Based Copolymer

Preferably, the polyolefin is or includes a propylene-based copolymer. The propylene-based copolymer can include ethylene-propylene (EP) random copolymers, ethylene-propylene-butylene (EPB) random terpolymers, heterophasic random copolymers, butylene polymers, metallocene polypropylenes, propylene-based elastomers or combinations thereof. In preferred embodiments, the propylene-based copolymer has a density in the range of 0.850 to 0.920 grams/$cm^3$, a DSC melting point in the range of 40 to 160° C., and a MFR in the range of 2 to 100 dg/min.

More preferably, the propylene-based copolymer is a grade of VISTAMAXX polymer (commercially available from ExxonMobil Chemical Company of Baytown, Tex.). Preferred grades of VISTAMAXX are VM6200, VM6202 and VM3000. Alternatively, the propylene-based copolymer can be a suitable grade of VERSIFY polymer (commercially available from The Dow Chemical Company of Midland, Mich.), Basell CATALLOY resins such as ADFLEX T100F, SOFTELL Q020F, CLYRELL SM1340 (commercially available from Basell Polyolefins of The Netherlands), PB (propylene-butene-1) random copolymers such as Basell PB 8340 (commercially available from Basell Polyolefins of The Netherlands), Borealis BORSOFT SD233CF, (commercially available from Borealis of Denmark), Total Polypropylene 3371 polypropylene homopolymer (commercially available from Total Petrochemicals of Houston, Tex.) and JPP 7500 C2C3C4 terpolymer (commercially available from Japan Polypropylene Corporation of Japan).

In one or more embodiments, the propylene-based copolymer has a propylene content ranging from 75 to 96 wt %, preferably ranging from 80 to 95 wt %, more preferably ranging from 84 to 94 wt %, most preferably ranging from 85 to 92 wt %, and an ethylene content ranging from 4 to 25 wt %, preferably ranging from 5 to 20 wt %, more preferably ranging from 6 to 16 wt %, most preferably ranging from 8 to 15 wt %.

The propylene-based copolymer can have a density ranging from 0.850 to 0.920 grams/$cm^3$, more preferably ranging from 0.850 to 0.900 grams/$cm^3$, most preferably from 0.870 to 0.885 grams/$cm^3$.

The DSC melting point of the propylene-based copolymer can range from 40° C. to 160° C., more preferably from 60° C. to 120° C. Most preferably, the DSC melting point can be below 100° C.

In one or more embodiments, the propylene-based copolymer has a MFR ranging from 2 to 100 dg/min, preferably ranging from 5 to 50 dg/min, more preferably ranging from 5 to 25 dg/min, most preferably from 5 to 10 dg/min.

The propylene-based copolymer can have a molecular weight distribution (MWD) below 7.0, preferably ranging from 1.8 to 5.0, more preferably ranging from 2.0 to 3.2, most preferably, less than or equal to 3.2.

The propylene-based copolymer can have a flexural modulus of preferably not more than 2100 MPa, more preferably not more than 1500 MPa, most preferably ranging from 20 MPa to 700 MPa.

The elongation of the propylene-based copolymer can be at least 300%, more preferably at least 400%, even more preferably at least 500%, and most preferably greater than 1000%. In some cases, elongations of 2000% or more are possible.

The heat of fusion of the propylene-based copolymer can be less than 75 J/g, less than 60 J/g, less than 55 J/g, less than 50 J/g, or less than 45 J/g. In one or more embodiments, the heat of fusion can range from a lower limit of 1.0 J/g, or 1.5 J/g, or 3.0 J/g, or 4.0 J/g, or 6.0 J/g, or 7.0 J/g to an upper limit of 30 J/g, or 40 J/g, or 50 J/g, or 60 J/g.

In one or more embodiments, the propylene-based copolymer can have isotactic stereoregular crystallinity. In other embodiments, the propylene-based copolymer has a crystallinity ranging from 2% to 65%.

The propylene-based copolymer can be produced via a single site catalyst polymerization process. In one or more embodiments, the single site catalyst incorporates hafnium.

Isotactic Thermoplastic

Preferably, the polyolefin is or includes at least one isotactic polypropylene (iPP) homopolymer. Examples of suitable iPP include, but are not limited to ExxonMobil PP4712E1, PP4352 and PP2252 that are commercially available from ExxonMobil Chemical Company. Another suitable iPP can be Total Polypropylene 3371 that is commercially available from Total Petrochemicals. An example of HCPP can be Total Polypropylene 3270 that is commercially available from Total Petrochemicals.

It will be understood by one of ordinary skill in the art that an isotactic propylene homopolymer that has an isotacticity of from about 89 to 99% can be considered either a so-called standard, film-grade isotactic polypropylene or a highly crystalline polypropylene. Standard, film-grade isotactic polypropylene has an isotactic stereoregularity of from about 89% to about 93%. Highly crystalline polypropylene (HCPP) has an isotactic stereoregularity greater than about 93%. HCPP exhibits higher stiffness, surface hardness, lower deflection at higher temperatures and better creep properties than standard, film-grade isotactic polypropylene. Further information relating to HCPP, including methods for preparation thereof, is disclosed in U.S. Pat. No. 5,063,264. Commercially available HCPPs include Chisso HF5010 and Chisso XF2805 (available from Chisso Chemical Co., Ltd. of Tokyo, Japan). Suitable HCPPs are also available commercially from Solvay in Europe.

Stereoregularity can be determined by IR spectroscopy according to the procedure set out in "Integrated Infrared Band Intensity Measurement of Stereoregularity in Polypropylene", J. L. Koenig and A. Van Roggen, Journal of Applied Polymer Science, Vol. 9, pp. 359-367 (1965) and in "Chemical Microstructure of Polymer Chains", Jack L. Koenig, Wiley-Interscience Publication, John Wiley and Sons, New York, Chichester, Brisbane, Toronto. Alternatively, stereoregularity can be determined by decahydronaphthalene (decalin) solubility or nuclear magnetic resonance spectroscopy (NMR), e.g., $^{13}C$ NMR spectroscopy using meso pentads.

Film Structure

The film can be a mono layer or multi-layer film. In a preferred embodiment, the film comprises at least one layer, whether the only layer of the mono-layer film or a layer of a multi-layer film, comprising of from about 5 wt % to about 95 wt % of the propylene-based copolymer based on the total weight of the film layer. Preferably, that film layer has a thickness of about 7 µm to about 200 µm; and more preferably 10 µm to about 150 µm; and more preferably 10 µm to about 100 µm; and more preferably 20 µm to about 90 µm; and more preferably 15 µm to about 75 µm. If part of a multi-layer film structure, the film layer makes up at least 5% of the total film thickness, or at least 10%, or at least 15%, or at least 17%, or at least 20%, or at least 22% of the total film thickness.

To facilitate discussion of different multi-layer film structures, the following notation is used herein. Each layer of a film is denoted as a different letter, such as A, B, C, D, E, etc. depending on the number of distinct layers. Where a film includes more than one layer such as more than one A layer, one or more prime symbols (', ", ''', etc.) are appended to the A symbol (i.e. A', A", etc.) to indicate layers of the same type (conventional or inventive) that can be the same or can differ in one or more properties, such as chemical composition, density, melt index, thickness, etc., within the range of these parameters defined herein. Finally, the symbols for adjacent layers are separated by a slash (/). Using this notation, a three-layer film can be denoted A/B/A or A/C/A. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/N/B/A" film is equivalent to an A/B/A'/A" film. When a multilayer film has two or more of the same layers, such as two or more B layers for example, the B layers can be the same, or can differ in thickness, chemical composition, density, melt index, CDBI, MWD, additives used, or other properties.

In at least one specific embodiment, the film is an A/B/A multi-layer film where each "A" layer ("skin layer") is the same or different and located on either side of the "B" layer ("core layer"). The ratio of thickness of the core layer and skin layers is generally preferred to be in the range of 1/1/1 to 1/4/1, more preferably 1/1.5/1 to 1/3/1, even more preferably 1/1.5/1 to 1/2.5/1, most preferably the ratio of core layer to skin layers will be 1/2/1, where the first and third numbers are understood to represent the skin layers and the middle number is representative of the core layer.

The thickness of each layer, and of the overall film, is not particularly limited, but is determined according to the desired properties of the film. Individual film layers can have a thickness of about 1 to 1000 microns (µm), more typically about 5 to 100 µm. Those skilled in the art will appreciate that the thickness of individual layers for multilayer films can be adjusted based on desired end use performance, resin or copolymer employed, equipment capability and other factors.

A typical total thickness of a multi-layer film can range from about 10 to about 100 µm. In one or more embodiments, the total film thickness can range from about 0.5 µm to 250 µm. In one or more embodiments, the total film thickness can range from a low of about 10, 50, or 100 µm to a high of about 120, 150, or 200 µm. In one or more embodiments, the total film thickness can range from about 25 µm to about 50 µm.

For example, the multi-layer films can have an optical gauge of about 0.1 mil to about 70 mil; about 0.3 mil to about 55 mil; about 0.5 mil to about 30 mil; or about 1 mil to about 10 mil. Optical gauge can be measured using any method or device known in the art, such as a laser micrometer. For example, the optical gauge can be measured using a Beta LaserMike Model 283-20 available from Beta LaserMike USA.

In one or more embodiments, multilayer films having any of the following illustrative structures can be used:

(a) two-layer films, such as A/B and B/B;

(b) three-layer films, such as A/B/A', A/A'/B, A/B/B', B/A/B', B/W/B", A/B/A, and A/C/A;

(c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B''';

(d) five-layer films, such as A/A'/A"/A'''/B, A/A'/A"/B/A", A/A'/B/A"/A", A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/A'/B'/B", A/B/B'/B"/A', B/A/A'/B'/B", B/A/B'/A'/B", B/A/B'/B"/A', A/B/B'/B"/B''', B/A/B'/B"/B''', B/B'/A/B"/B''', B/B'/B"/B'''/B'''', and A/B/C/B/A; and similar structures for films having six, seven, eight, nine or more layers. It should be appreciated that films having still more layers can be used.

Production of Films

The films can be formed by any number of well known lamination, extrusion or coextrusion techniques. Any of the blown, tentered or cast film techniques commonly used is suitable. For example, a resin composition can be extruded in a molten state through a flat die and then cooled to form a film, in a cast film process. Alternatively, the composition can be extruded in a molten state through an annular die and then blown and cooled to form a tubular, blown film, which can then be used to make sacks or slit and unfolded to form a flat film.

The extrusion temperatures, die temperatures, and chill roll temperatures are dependent on the composition of the polymeric composition employed, but will generally be within the following ranges for the compositions described herein: extrusion temperature, 170° C. to 250° C.; die temperature, 170° C. to 250° C.; and chill roll temperature, 10° C. to 65° C. The film making process may also include embossing rolls to chill and form the film.

The films can also be unoriented, uniaxially oriented or biaxially oriented. In one or more embodiments, the multi-layer films can be uniaxially or biaxially oriented. Orientation in the direction of extrusion is known as machine direction (MD) orientation. Orientation perpendicular to the direction of extrusion is known as transverse direction (TD) orientation. Orientation can be accomplished by stretching or pulling a film first in the MD followed by TD orientation. Blown films or cast films can also be oriented by a tenter-frame orientation subsequent to the film extrusion process, again in one or both directions. Orientation can be sequential or simultaneous, depending upon the desired film features. For example, orientation ratios can be about three to about six times the extruded width in the machine direction and between about four to about ten times the extruded width in the transverse direction. Typical commercial orientation processes are BOPP tenter process, and blown film.

In a particular film orientation embodiment, an interdigitating grooved roller assembly is used to simultaneously produce a desirable crinkled surface finish and orient the film. Such processes are described in U.S. Pat. No. 4,368,565. In this process, the film is stretched between two interlocking grooved rollers which are able to both biaxially stretch the film and orient it.

For multiple-layer films, the materials forming each layer can be coextruded through a coextrusion feedblock and die assembly to yield a film with two or more layers adhered together but differing in composition. Coextrusion can be adapted to cast film or blown film processes. Multiple-layer films can also be formed by combining two or more single layer films using conventional lamination techniques.

In one or more embodiments, the propylene-based copolymer and PP resin blends can be prepared by dry blending pellets of the two resins and feeding the pellet blend into the hopper of the film line being used to make film. The propylene-based copolymer, PP resin and any additional polyolefin resins can be blended during extrusion and thus eliminating the need for a masterbatch.

In one or more embodiments, dry blends of pellets of the propylene-based copolymer and PP resin can pre-blended in a compounder to form a masterbatch. Suitable compounders include any device or procedure that provides an intimate mixture of the polymeric components. For example, such devices include, but are not limited to a CARVER press for melt pressing the components together or a BANBURY mixer or a BRABENDER mixer for solution or melt blending of the components. Additional equipment used for continuous mixing procedures can include single and twin screw extruders, static mixers, impingement mixers, as well as other machines and processes designed to disperse the components in intimate contact.

Once the masterbatch is formed, an additional amount of the pelletized polyolefins and the masterbatch can be fed into the hopper of an extruder or a rotomolder, or both. Suitable extruders include those known in the art as capable of forming a film, a sheet, a pipe, a blow molded part or an injection molded part. For example, suitable extruders include a blown film extruder, a blow molding extruder, an injection molding extruder.

In one or more embodiments, the propylene-based copolymer and PP resin can be blended together within the hopper of an extruder. In one embodiment, the propylene-based copolymer and PP resin can be blended in situ, during the polymerization of the propylene-based copolymer, i.e. a reactor blend. In this embodiment, the propylene-based copolymer can be formed in a first reactor, and then passed into a second rector wherein the PP resin can be contemporaneously polymerized and blended.

Multi-Layer Film

At least one layer of the multi-layer film, and in some embodiments each layer, can include a blend of one or more propylene-based copolymers and one or more other polyolefins. When a blend is used, the propylene-based copolymer can be present in an amount of from at least about 5 wt % to about 95 wt % based on the total weight of the film layer, preferably about 10 wt % to about 80 wt %, more preferably about 20 wt % to about 40 wt %, even more preferably about 30 wt % to about 35 wt %. Amounts of the propylene-based copolymer of less than 25 wt % (e.g., 10 wt %) or greater than 75 wt % (e.g., 90 wt % or more) are also permissible, depending upon the desired properties for the film product.

Core Layer

In one or more embodiments, the core layer can include any one or more polyolefins described. In at least one specific embodiment, the core layer is or includes at least one propylene-based copolymer. In at least one other specific embodiment, the core layer is or includes a blend of at least one propylene-based copolymer and one or more other polyolefins.

A preferred blend of one or more propylene-based copolymers and one or more other polyolefins contains about 5 wt % to about 95 wt % of the propylene-based copolymer, based on the total weight of the film layer, preferably about 10 wt % to about 80 wt %, more preferably about 20 wt % to about 40 wt %, even more preferably, about 30 wt % to about 35 wt %. Amounts of the propylene-based copolymer of less than 25 wt % (e.g., 10 wt %) or greater than 75 wt % (e.g., 90 wt % or more) are also permissible, depending upon the desired properties for the film product.

Skin Layer

In one or more embodiments, the skin layer can include one or more polyolefins described. In some preferred embodiments, the skin layer can include at least one polymer selected from the group consisting of propylene homopolymer, ethylene-propylene copolymer, butylene homopolymer and copolymer, ethylene-propylene-butylene (EPB) terpolymer, ethylene vinyl acetate (EVA), metallocene-catalyzed propylene homopolymer, and combinations thereof.

Heat sealable blends can be utilized in providing the skin layer. Thus, along with the skin layer polymer identified above there can be, for example, other polymers, such as polypropylene homopolymer, e.g., one that can be the same as, or different from, the iPP of the core layer. The skin layer can additionally or alternatively include ethylene-propylene random copolymers, LDPE, linear low density polyethylene (LLDPE), medium density polyethylene (MDPE), and combinations thereof. Particular examples include EXCEED 1012 and 1018 metallocene polyethylenes, EXACT 5361, 4049, 5371, 8201, 4150, 3132 ethylene-based plastomers, EMCC LD 302 low density polyethylene (LDPE), all commercially available from ExxonMobil Chemical Company.

Tie-Layer

In one or more embodiments, the tie layer can include one or more hydrocarbon resins and any one or more polyolefins described. The hydrocarbon resin can be present in an amount of up to about 90 wt %, based on the entire weight of the tie layer. In one or more embodiments, the hydrocarbon resin can range from a low of about 10 wt %, 20 wt % or 30 wt % to a high of about 40 wt %, 50 wt %, or 60 wt %, based on the entire weight of the tie layer. In one or more embodiments, the hydrocarbon resin can range from a low of about 12 wt %, 17 wt % or 23 wt % to a high of about 35 wt %, 40 wt %, or 45 wt %, based on the entire weight of the tie layer.

The hydrocarbon resin can be a low molecular weight, hydrogenated hydrocarbon which is compatible with the polyolefin(s) of the core layer and which provide the desired enhancement of film properties. The hydrocarbon resin can have a number average molecular weight less than about 5,000, for example, less than about 2,000, e.g., from about 500 to about 1,000.

The hydrocarbon resin can be natural or synthetic. Preferably, the hydrocarbon resin has a softening point (ASTM D6493-05) less than 200° C. In one or more embodiments, the softening point can range of from about 60° C. to about 180° C. In one or more embodiments, the softening point can range from a low of about 60° C., 70° C., or 80° C. to a high of about 160° C., 170° C., or 180° C. In one or more embodiments, the softening point can range from about 100° C. to about 150° C., about 120° C. to about 145° C., or about 125° C. to about 140° C. In one or more embodiments, the softening point of the hydrocarbon resin is less than 165° C., 160° C., 155° C., 150° C., 145° C., 140° C., 130° C., 120° C., 110° C., 100° C., 90° C., 80° C., 70° C., or 60° C.

Suitable hydrocarbon resins include, but are not limited to petroleum resins, terpene resins, styrene resins, and cyclopentadiene resins. In one or more embodiments, the hydrocarbon resin can be selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

Hydrocarbon resins that can be suitable for use as described herein include EMPR 120, 104, 111, 106, 112, 115, EMFR 100 and 100A, ECR-373 and ESCOREZ 2101, 2203, 2520, 5380, 5600, 5618, 5690 that are commercially available from ExxonMobil Chemical Company; ARKON M90, M100, M115 and M135 and SUPER ESTER rosin esters (commercially available from Arakawa Chemical Company of Japan); SYLVARES phenol modified styrene, methyl styrene resins, styrenated terpene resins, ZONATAC terpene-aromatic resins, and terpene phenolic resins (commercially available from Arizona Chemical Company of Jacksonville, Fla.); SYLVATAC and SYLVALITE rosin esters (commercially available from Arizona Chemical Company of Jacksonville, Fla.); NORSOLENE aliphatic aromatic resins (commercially available from Cray Valley of France); DERTOPHENE terpene phenolic resins (commercially available from DRT Chemical Company of Landes, France); EASTOTAC resins, PICCOTAC $C_5/C_9$ resins, REGALITE and REGALREZ aromatic and REGALITE cycloaliphatic/aromatic resins (commercially available from Eastman Chemical Company of Kingsport, Tenn.); WINGTACK ET and EXTRA (commercially available from Sartomer of Exton, Pa.); FORAL, PENTALYN, and PERMALYN rosins and rosin esters (commercially available from Hercules, now Eastman Chemical Company of Kingsport, Tenn.); QUINTONE acid modified $C_5$ resins, $C_5/C_9$ resins, and acid modified $C_5/C_9$ resins (commercially available from Nippon Zeon of Japan); and LX mixed aromatic/cycloaliphatic resins (commercially available from Neville Chemical Company of Pittsburgh, Pa.); CLEARON hydrogenated terpene aromatic resins (commercially available from Yasuhara of Japan); and PICCOLYTE (commercially available from Loos & Dilworth, Inc. of Bristol, Pa.). Other suitable hydrocarbon resins can be found in U.S. Pat. No. 5,667,902, incorporated herein by reference. The preceding examples are illustrative only and by no means limiting.

Preferred hydrocarbon resins for use in the films described include saturated alicyclic resins. Such resins, if used, can have a softening point in the range of from 85° C. to 140° C., or preferably in the range of 100° C. to 140° C., as measured by the ring and ball technique. Examples of suitable, commercially available saturated alicyclic resins are ARKON-P (commercially available from Arakawa Forest Chemical Industries, Ltd., of Japan). U.S. Pat. No. 5,667,902 contains a more complete discussion on hydrocarbon resins.

Additives

In one or more embodiments, one or more additives can be present in any one or more layers of the film. Suitable additives can include, but are not limited to opacifying agents, pigments, colorants, cavitating agents, slip agents, antioxidants, anti-fog agents, anti-static agents, anti-block agents, fillers, moisture barrier additives, gas barrier additives and combinations thereof. Such additives can be used in effective amounts, which vary depending upon the physical or barrier property required.

Examples of suitable opacifying agents, pigments or colorants include but are not limited to iron oxide, carbon black, aluminum, titanium dioxide ($TiO_2$), calcium carbonate ($CaCO_3$), polybutylene terephthalate (PBT), talc, beta nucleating agents, and combinations thereof.

Slip agents can include higher aliphatic acid amides, higher aliphatic acid esters, waxes, silicone oils, and metal soaps. Such slip agents can be used in amounts ranging from 0.1 to 2 wt % based on the total weight of the layer to which it can be added. An example of a slip additive that can be useful for this invention can be erucamide.

Non-migratory slip agents can be useful especially in the one or more skin layers. Non-migratory slip agents can include polymethyl methacrylates (PMMA). The non-migratory slip agent can have a mean particle size in the range of from about 0.5 to 8 microns, or 1 to 5 microns, or 2 to 4 microns, depending upon layer thickness and desired slip properties. Alternatively, the size of the particles in the non-migratory slip agent, such as PMMA, can be greater than 20% of the thickness of the skin layer containing the slip agent, or greater than 40% of the thickness of the skin layer, or greater than 50% of the thickness of the skin layer. The size of the particles of such non-migratory slip agent can also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes can also be contemplated.

Suitable anti-oxidants can include phenolic anti-oxidants, such as IRGANOX 1010 (commercially available from Ciba-Geigy Company of Switzerland). Such an anti-oxidant can be generally used in amounts ranging from 0.1 to 2 wt %, based on the total weight of the layer(s) to which it can be added.

Anti-static agents can include alkali metal sulfonates, polyether-modified polydiorganosiloxanes, polyalkylphenylsiloxanes, and tertiary amines. Such anti-static agents can be used in amounts ranging from about 0.05 to 3 wt %, based upon the total weight of the layer(s).

Examples of suitable anti-blocking agents can include silica-based products such as SYLOBLOC 44 (commercially available from Grace Davison Products of Colombia, Md.), PMMA particles such as EPOSTAR (commercially available from Nippon Shokubai Co., Ltd. of Japan), or polysiloxanes such as TOSPEARL (commercially available from GE Bayer Silicones of Wilton, Conn.). Such an anti-blocking agent can include an effective amount up to about 3000 ppm of the weight of the layer(s) to which it can be added.

Suitable fillers can include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives can include effective amounts of low-molecular weight resins, hydrocarbon resins, particularly petroleum resins, styrene resins, cyclopentadiene resins, and terpene resins.

Optionally, one or more skin layers can be compounded with a wax or coated with a wax-containing coating, for lubricity, in amounts ranging from 2 to 15 wt % based on the total weight of the skin layer. Any conventional wax, such as, but not limited to CARNAUBA wax (commercially available from Michelman Corporation of Cincinnati, Ohio) that can be useful in thermoplastic films can be contemplated.

Anneal

Any one or more layers of the film, as well as the resulting multi-layer film, can be thermally annealed. Thermal annealing is conducted by maintaining the polymer blend or article made from the blend at a temperature between room temperature and 160° C. for a period of from 15 seconds to 7 days. A typical annealing period is 3 days at 50° C. or 5 minutes at 100° C. The annealing time and temperature can be adjusted for any particular blend composition by experimentation. The annealing process leads to a material with greater recovery from tensile deformation.

Surface Treatment

One or both of the outer surfaces of any layer of the multi-layered film structure can be surface-treated to increase the surface energy to render the film receptive to metallization, coatings, printing inks, and/or lamination. The surface treatment can be carried out according to one of the methods known in the art including corona discharge, flame, polarized flame, plasma, chemical treatment, or any two or more in combination.

In one or more embodiments, one or both of the outer surfaces of the film, e.g. the skin layer(s) can be metallized or coated. Such surfaces can be metallized using conventional methods, such as physical, chemical, or vacuum metallization techniques by deposition of a metal layer such as aluminum, copper, silver, chromium, or mixtures thereof. Suitable coatings can include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings are preferably applied by an emulsion coating technique, but can also be applied by co-extrusion and/or lamination.

The PVdC coatings that are suitable for use with the multi-layer films are any of the known PVdC compositions heretofore employed as coatings in film manufacturing operations, e.g., any of the PVdC materials described in U.S. Pat. Nos. 4,214,039, 4,447,494, 4,961,992, 5,019,447, and 5,057,177, incorporated herein by reference.

Known vinyl alcohol-based coatings, such as PVOH and EVOH, that are suitable for use with the multi-layer films invention include VINOL$^T$ 125 or VINOL$^T$ 325 (both commercially available from Air Products, Inc. of Allentown, Pa.). Other PVOH coatings are described in U.S. Pat. No. 5,230,963, incorporated herein by reference.

Before applying a coating composition or top coatings, to the outer surface, the surface to be coated can be treated as described to increase its surface energy. For example, the film can be treated using flame treatment, plasma, corona discharge, film chlorination (e.g., exposure of the film surface to gaseous chlorine), treatment with oxidizing agents such as chromic acid, hot air or steam treatment, flame treatment and the like. Although any of these techniques can be effectively employed to pre-treat the film surface, a frequently preferred method can be corona discharge, an electronic treatment method that includes exposing the film surface to a high voltage corona discharge while passing the film between a pair of spaced electrodes. After treatment of the film surface, the coating composition can be then applied thereto.

In one or more embodiments, a primer coating can be applied as a top coating to one or more surfaces of a substrate (e.g., multi-layer film). The primer can be applied to a surface before application of a coating composition described herein or before application of another top coating. When a primer is applied, the substrate can be surface treated by one of the foregoing methods. In another embodiment, the primer coating can be added to any of the coating compositions described.

Such primer materials are well known in the art and include, for example, epoxy and poly(ethylene imine) (PEI) materials. U.S. Pat. Nos. 3,753,769, 4,058,645 and 4,439,493, each incorporated herein by reference, disclose the use and application of such primers. The primer provides an overall adhesively active surface for thorough and secure bonding with the subsequently applied coating composition and can be applied to a substrate by conventional solution coating means, for example, by roller application.

Film Properties

Physical properties of the film can vary from those of the polymer or polymer blend, depending on the film forming techniques used. Certain unique properties of the films are described in more detail below.

In one or more embodiments, the films can have a 1% Secant Modulus in the machine direction (MD), as measured according to ASTM D882-95a, of about 10 K psi to about 106 K psi. In one or more embodiments, the films can have a 1% Secant Modulus in the transverse direction (TD), as measured according to ASTM D882-95a, of about 12 K psi to about 106 K psi.

In one or more embodiments, the films can have a MD tensile at yield, as measured by ASTM D882-95a, of about 1.1 K psi to about 3.5 K psi. In one or more embodiments, the films can have a TD tensile at yield, as measured by ASTM D882-95a, of about 0.7 K psi to about 3.3 K psi. In one or more embodiments, the films can have a ratio of MD tensile at 200% to MD tensile at yield, as measured by ASTM D882-95a, of about 1.65 to about 5.1.

In one or more embodiments, the films can have a MD ultimate tensile, as measured by ASTM D882-95a, of about 7.3 K psi to about 18 K psi. In one or more embodiments, the films can have a TD ultimate tensile, as measured by ASTM D882-95a, of about 5.2 K psi to about 6.7 K psi.

In one or more embodiments, the films can have a MD Elmendorf Tear, as measured by ASTM D1922-94, of about 5 g to about 416 g. In one or more embodiments, the films can have a MD Elmendorf Tear, as measured by ASTM D1922-94, of about 5 g/mil to about 450 g/mil. In one or more embodiments, the MD Elmendorf Tear can range from a low of about 5 g/mil, 10 g/mil, or 20 g/mil to a high of about 30 g/mil, 55 g/mil, or 80 g/mil.

In one or more embodiments, the films can have a TD Elmendorf Tear, as measured by ASTM D1922-94, of about 850 g to about 1600 g. In one or more embodiments, the films can have a TD Elmendorf Tear, as measured by ASTM D1922-94, of about 250 g/mil to about 1100 g/mil. In one or more embodiments, the TD Elmendorf Tear can range from a low of about 250 g/mil, 300 g/mil, or 400 g/mil to a high of about 900 g/mil, 1,000 g/mil, or 1,100 g/mil.

In one or more embodiments, the films can have a Dart Impact (Method A), as measured according to ASTM D1709-91, of about <48 g to about 594 g. In one or more embodiments, the films can have a Dart Impact (Method A), as measured according to ASTM D1709-91, of about <42 g/mil to about 153 g/mil.

In one or more embodiments, the films can have a peak puncture force, as measured by Exxon-PLFL-201,01, of about 2.8 lbs to about 39.7 lbs. In one or more embodiments, the films can have a peak puncture force, as measured by Exxon-PLFL-201,01, of about 4.4 lbs/mil to about 10.9 lbs/mil.

In one or more embodiments, the films can have a puncture break energy, as measured using the test procedure described below in Table 1, of about 4.3 in-lbs to about 73.3 in-lbs. In one or more embodiments, the films can have a puncture break energy, as measured as measured using the test procedure described below in Table 1, of about 5.3 in-lbs/mil to about 24.7 in-lbs/mil.

In one or more embodiments, the films can have a haze, as measured according to ASTM D1003-95, of about 0.2 to about 12.9. Preferably, the films have a haze of less than 10%; less than 8%; less than 6%; less than 5%; less than 4%, or less than 2%. In one or more embodiments, the haze can range from a low of about 2%, 4%, or 5% to a high of about 8%, 10%, or 13%.

In one or more embodiments, the films can have a Gloss 45° MD, as measured according to ASTM D2457-90, of about 69% to about 91%. In one or more embodiments, the films can have a Gloss 45° TD, as measured according to ASTM D2457-90, of about 71 to about 92. In one or more embodiments, the Gloss 45° MD can range from a low of about 69%, 70%, or 75% to a high of about 78%, 88%, or 90%.

In one or more embodiments, the films can have a MD break elongation, as measured by ASTM D882-95a, of about 412% to about 767%. In one or more embodiments, the films can have a TD break elongation, as measured by ASTM D882-95a, of about 707% to about 1017%.

In one or more embodiments, the films can have a MD shrink, as measured by ASTM D1204, of about 57% to about 89%. In one or more embodiments, the films can have a TD shrink, as measured by ASTM D1204, of about −5% to about −59%.

In one or more embodiments, the films can have a Reblock (I/I) of about 117 g to about 214 g. Reblock is preferably measured according to the ASTM D 3354 reblock test with the exception that the film is layered-up so the inside surface of the film is in contact with itself and the layered structure is heated at 60° C. for 24 hrs under a 4.2 lb load before being tested.

Applications

The films possess an excellent balance of mechanical properties, toughness, sealability and cling/adhesive properties. As such, the films can be used in hot fill applications or packaging materials heated at temperatures up to 260° F. (126° C.) during packaging, such as cement, sand, salt, and retort bag applications such as pouches, bags and sacks containing consumer products including food. The films can also be used for shrink films and form fill and seal applications requiring abuse resistance. The films also possess good softness/feel and optical/clarity properties useful for food packaging at any temperature.

Specific applications include trash bags, adult care items, agricultural films, aluminum foil laminates, aluminum laminates, asphalt films, auto panel films, bacon packaging, bag-in-box liquid packaging applications, bakery goods, banana film, batch inclusion bags, bathroom tissue overwrap, biaxially oriented films, biaxially oriented polypropylene (BOPP) films, biscuits packages, boutique bags, bread bags, bubble wrap, building film, cake mix packaging, can liners, candy wrap, cardboard liquid packaging, carpet film, carry-out sacks, cement packaging, cereal liners, cheese packaging, chemical packaging, clarity films, coffee packaging, coin bags, collation shrink films, confectionary packaging, construction sheeting, construction film, consumer goods, consumer trash bags, continuous wrap, convenience packaging, cosmetics packaging, counter bags, cover film, cup/cutlery overwrap, deli and bakery wrap, detergent packaging, diaper backsheet, disposables (diapers, sanitary, etc), dry food packaging, dry grains, dunnage bags, fertilizer, fish & seafood packaging, food packaging, foundation film, freeze-dried products, freezer films, frozen food, fruit juice packaging, furniture bags, garden sacks, garment bags, geomembrane liners, gloves, gravel bags, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware packaging, industrial liner, industrial trash bags, industrial spare parts packaging, in store self-service bags, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat packaging, medical products, medical draping, medium duty bags, merchandise bags, metallized laminates, military hardware packaging, milk bags, milk powder packaging, modified atmosphere packaging, mulch film, multi-wall sack liner, newspaper bags, nose tissue overwrap, olive oil packaging, packaging of beans, packaging of cementations products such as grout, packaging of dry and sharp products, pallet shrink film, pancake batter bags, paper handkerchief overwrap, paper laminates, pasta overwrap, pelletized polymer, perfume packaging, personal care packaging, pesticides packaging, pharmaceuticals packaging, pigment packaging, pizza packaging, polyamide laminates, polyester laminates, potato product packaging, potting soil bags, pouches, poultry packaging, pre-formed pouches, produce bags, produce packaging, rack and counter film, ready made food packaging, ready meal packaging, retortable product packaging, films for the rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil bags, soup packaging, spice packaging, stand up pouches, storage bags, stretch films, stretch hooders, stretch wrap, supermarket bags, surgical garb, take out food bags, textile films, refuse bags, thermoformed containers, thin films, tissue overwrap, tobacco packaging, tomato packaging, ketchup packaging, trash bags, t-shirt bags, vacuum skin packaging, vegetable packaging, vertical form-fill-and-seal (FFS) packaging, horizontal FFS packaging, tubular FFS packaging, and water bottle packaging.

In addition to films, the resin blends described herein will find utility in other applications like, but not limited to: extrusion coating, injection molding, rotomolding, and blow molding applications.

EXAMPLES

The foregoing discussion can be further described with reference to the following non-limiting examples. Several monolayer cast films, co-extruded cast films, and co-extruded blown films were produced and tested. The resulting films surprisingly showed a significant improvement in toughness, feel, stretch capabilities, reblock, optical/clarity and sealability. Even more surprising, these films reversibly adhered together when placed under pressure.

In the following examples, each film had at least one layer containing a propylene-based copolymer based on one or more embodiments described. The films were then analyzed using the standard film testing procedures summarized in Table 1.

TABLE 1

| Film Test Procedures | | | |
|---|---|---|---|
| Test Description | Method | Based On ASTM Test | Deviation from standardized test. |
| 1% Secant Modulus | ASTM D882-95a | | |
| Tensile Test | ASTM D882-95a | | |
| Elmendorf Tear | ASTM D1922-94 | | |
| Dart Impact | ASTM D1709-91 | | |
| Puncture Test | Exxon-PLFL-201,01 | D5748-95 | A steal probe is used instead of a Teflon coated probe |
| Haze | ASTM D1003-95 | | |
| Gloss | ASTM D2457-90 | | |
| COF | Exxon PLFL-220,001 | ASTM D 1894 | A mechanical arm is used instead of a string to pull the block |
| Reblock | Exxon PLFL-219,001 | ASTM D3354-08 | Film is separated and then layed-up I/I and heated at 60° C. for 24 hrs under a 4.2 lb load before being tested. |
| Average Gauge Mic | Exxon PLFL-238,001 | ASTM D374 | Calibrated yearly. |
| Density | ASTM D1505-90 | | |
| DSC* | Exxon PLDS-401,001 | ASTM 3417-97 | |
| Melt Index | ASTM D1238-94 | | |
| Break Elongation | ASTM D882-95a | | |
| Shrink | | ASTM D1204 | |

*Based on ASTM 3417-97

Each film was prepared from the resins discussed below and described in Tables 2 and 3. In each Example, VISTAMAXX 3000 had an ethylene content of 11-13 wt %, a density of about 0.871 g/cm$^3$, a MFR (230° C., 2.16 kg) of about 7-8 g/10 min, a heat of fusion of about 21.4-28.8 J/g and a melting point of about 56-65° C.

VISTAMAXX 6100 had an ethylene content of 16 wt %, a density of about 0.86 g/cm$^3$, a MFR (230° C., 2.16 kg) of about 3 g/10 min, a heat of fusion of about 29 J/g and a melting point of about 56° C. to 62° C.

The polypropylene homopolymer (PP2252) had a density of 0.911 g/cm$^3$, a MFR (230° C., 2.16 kg) of about 3.5 g/10 min to 4.5 g/10 min, and a melting point of about 163° C.

The polypropylene homopolymer (PP4352F1) had a MFR (230° C., 2.16 kg) of about 2.9 g/10 min to 4.5 g/10 min, and a melting point of about 163° C.

EXCEED 1018CA is a metallocene catalyzed, linear polyethylene. EXCEED 1018CA had a density of 0.918 g/cm$^3$, a MI (190° C., 2.16 kg) of about 1 g/10 min, and a melting point of about 119° C. LD 150BW is a low density polyethylene. LD 150BW had a density of 0.923 g/cm$^3$, a MI (190° C., 2.16 kg) of about 0.75 g/10 min, and a melting point of about 108° C. Each resin is commercially available from Exxon Mobil Chemical Company.

Examples 1, 2 and 3 were prepared using the resins shown in Table 2, which also shows selected physical properties of those resins.

TABLE 2

Resins Used in Making the Films of Examples 1, 2 and 3

| Material | PP2252 | VISTAMAXX 3000 |
|---|---|---|
| Rheology | | |
| MI ($I_2$, 2.16 Kg, 190° C.) | 4.55 | 1.14 |
| HLMI ($I_{21}$, 2.16 Kg, 190° C.) | 543.70 | 37.47 |
| MI Swell | 1.26 | 1.06 |
| Ratio ($I_{21}/I_2$) | 119.50 | 32.87 |
| Density (g/cm³) | | |
| Molded | 0.9106 | 0.8705 |
| DSC (Celsius) | | |
| 2nd melt | 163.87 | 56.14 |
| 2nd peak | | 8.03 |
| Tc | 120.26 | |

Example 4 was prepared using the resins shown in Table 3, which also shows selected physical properties of those resins.

TABLE 3

Resin Compositions

| | Resin | | | |
|---|---|---|---|---|
| | PP | VISTAMAXX | Exceed | LD |
| Property | 4352F1 | 3000 | 6100 | 1018CA | 150BW |
| MI ($I_2$, 2.16 Kg, 190° C.) | 2.9 | 8 | 3 | 1.0 | 0.75 |
| Density (g/cm³) | | 0.871 | 0.855 | 0.918 | 0.923 |
| DSC (Celsius) | 160 | 57 | 50 | 118 | 108 |

Example 1

The monolayer cast films of Example 1 were made from the resins described in Table 2 using a BLACK CLAWSON cast film line equipped with a 3½" diameter MIGRANDY 30:1 barrier screw (#M22910) equipped with a Koch SMX static mixer and driven by a 150 HP DC motor. It was operated with a screw speed that decreased to 68 rpm from 130 rpm as the VISTAMAXX 3000 content in the film increased from 0% to 90%. The temperature of the melt decreased to 455° F. from 501° F. (to 235° C. from 260° C.) as the VISTAMAXX 3000 content in the film increased from 0% to 90%.

The melt was extruded through a five layer CLOEREN feed block and 42" wide EPOCH 3201 series slot die manufactured by "The Cloeren Company" operated with a 0.020 inch manually adjustable flex die lip. The melt was extruded onto a 36" diameter primary chill roll cored for cooling water circulation and operated with a water inlet temperature of 51-53° F. (11-12° C.). The melt curtain was pinned to the cast roll using an air knife located 4.5 inches from the die and 0.25 inches from the roll. The carriage position was 2.75 inches past vertical, and its height was set at 4. The melt was extruded at a production rate of about 336-460 lbs/hr, which is equivalent to a die throughput rate of 10-14 lbs/hr/inch of die.

Table 4 shows selected physical properties of the films of Example 1. The COF of all the films was greater than 1.

TABLE 4

Physical Properties of Films of Example 1

| | EXAMPLE | | | | | |
|---|---|---|---|---|---|---|
| Blend Composition | 7* | 21A | 26A | 31A | 31 | 26 |
| VISTAMAXX 3000 | 0 | 10 | 20 | 40 | 60 | 80 |
| PP 2252 | 100 | 90 | 80 | 60 | 40 | 20 |
| Average Gauge (mil) | 1.15 | 0.96 | 0.97 | 1.1 | 0.95 | 0.96 |
| Haze (%) | 3.24 | 0.84 | 0.6 | 0.24 | 0.35 | 0.42 |
| Gloss 45° MD | 78.9 | 88.3 | 89.5 | 90.5 | 89.8 | 89.1 |
| Gloss 45° TD | 77.6 | 88.1 | 89.4 | 91.1 | 90.5 | 88 |
| Reblock (I/I, grams) | 64.7 | 128.8 | 140.2 | 182.6 | >214 | >214 |
| MD 1% Secant (psi) | 125224 | 98598 | 72745 | 39218 | 22137 | 10861 |
| TD 1% Secant (psi) | 128406 | 105236 | 77445 | 40205 | 24451 | 12202 |
| MD Tensile @ Yield (psi) | 3870 | 3384 | 2753 | 1933 | 1717 | 1135 |
| TD Tensile @ Yield (psi) | 3832 | 3162 | 2468 | 1575 | 1093 | 740 |
| MD Tensile @ 200% (psi) | 4067 | 5576 | 4652 | 3685 | 4602 | 3155 |
| MD Tensile @ 200%/MD Tensile @ Yield Ratio | 1.05 | 1.65 | 1.69 | 1.91 | 2.68 | 2.78 |
| MD Ultimate Tensile (psi) | 13856 | 15229 | 13817 | 12700 | 12499 | 9807 |
| TD Ultimate Tensile (psi) | 8307 | 6693 | 6062 | 6600 | 5753 | 5258 |
| MD Break Elongation (%) | 606 | 509 | 515 | 549 | 426 | 421 |
| TD Break Elongation (%) | 854 | 856 | 837 | 884 | 955 | 1017 |
| MD Elmendorf Tear (g) | 14.5 | 8.5 | 9.3 | 12.3 | 6.4 | 415.7 |
| TD Elmendorf Tear (g) | 794.2 | 851.2 | 872 | 1000.6 | 890.2 | 1027.2 |
| MD Elmendorf Tear (g/mil) | 13.1 | 8.9 | 9.4 | 10.8 | 6.7 | 433 |
| TD Elmendorf Tear (g/mil) | 763.7 | 851.2 | 918 | 909.7 | 918 | 1037.6 |
| Average MD & TD Elmendorf Tear (g/mil) | 388 | 430 | 463 | 460 | 462 | 727 |
| Dart Drop (g, Method A) | <48 | <48 | <48 | 104 | 83 | 101 |
| Dart Drop (g/mil, Method A) | <42 | <42 | <49.5 | 94.6 | 87.4 | 105.2 |
| Peak Puncture Force (lbs) | 4.61 | 4.81 | 4.48 | 4.86 | 4.42 | 4.77 |

TABLE 4-continued

Physical Properties of Films of Example 1

| Blend Composition | EXAMPLE | | | | | |
|---|---|---|---|---|---|---|
| | 7* | 21A | 26A | 31A | 31 | 26 |
| Puncture Break Energy (in-lbs) | 6.10 | 7.98 | 7.38 | 9.26 | 8.21 | 11.98 |
| Peak Puncture Force (lbs/mil) | 4.01 | 5.01 | 4.62 | 4.42 | 4.66 | 4.97 |
| Puncture Break Energy (in-lbs/mil) | 5.30 | 8.32 | 7.61 | 8.42 | 8.64 | 12.48 |
| MD Shrink (%) | 85 | 89 | 86 | 81 | 84 | 77 |
| TD Shrink (%) | −34 | −54 | −49 | −48 | −54 | −53 |

*Comparative Example.

Higher loadings (>/=40%) of VISTAMAXX 3000 increased the toughness, feel, stretch capabilities, reblock and optical/clarity properties of monolayer cast PP 2252 film.

A 40-80% loading of VISTAMAXX 3000 increased the toughness of PP 2252 cast films. The VISTAMAXX containing films' Dart Drop value, under Method A, was 94.6-105.2 g/mil, an increase from less than 42 g/mil for barefoot PP 2252 film. The VISTAMAXX containing films' tear resistance (Average MD & TD Elmendorf Tear) was 460-727 g/mil, an increase from 388 g/mil for barefoot PP 2252 film. The VISTAMAXX containing films' Peak Puncture Force was 4.42-4.97 lbs/mil, an increase from 4.01 lbs/mil for barefoot PP 2252 film. The VISTAMAXX 3000 containing films' Puncture Break Energy was 8.42-12.48 in-lbs/mil, an increase from 5.30 in-lbs/mil for barefoot PP 2252 film.

A 40-80% loading of VISTAMAXX 3000 increased the reblock of PP 2252 cast film. The VISTAMAXX 3000 containing film's Reblock (I/I) was greater than or equal to 182 g, an increase from 64.7 g for barefoot PP 2252 film.

A 40-80% loading of VISTAMAXX 3000 increased the stretch capability of PP 2252 cast film. The VISTAMAXX 3000 containing films' MD Tensile at 200% Elongation to MD Tensile at Yield ratio was 1.91-2.78, an increase from 1.05 for barefoot PP 2252 film.

A 40-80% loading of VISTAMAXX 3000 increased the softness/feel of PP 2252 cast film. The VISTAMAXX 3000 containing films' 1% MD Secant Modulus was 11-39 Kpsi, a decrease from 125 Kpsi for barefoot PP 2252 film.

A 40-80% loading of VISTAMAXX 3000 increased the optical/clarity properties of PP 2252 cast film. The VISTAMAXX 3000 containing films' haze was 0.24-0.42%, a decrease from 3.24% for the comparative PP 2252 film; and the VISTAMAXX 3000 containing films' gloss increased to greater than 89, from less than 80 for barefoot PP 2252 film.

Low loadings (<40%) of VISTAMAXX 3000 increased the toughness, reblock, and optical/clarity properties of monolayer cast PP 2252 film while retaining the film's stiffness and lifting ability (compare the properties of Film 7 with those of Films 21A).

A 10% loading of VISTAMAXX 3000 increased the toughness of PP 2252 cast films. The VISTAMAXX containing films' Average MD & TD Elmendorf Tear increased to greater than 400 g/mil from less than 400 g/mil for barefoot PP 2252 film. The VISTAMAXX containing films' Peak Puncture Force was 5.01 lbs/mil, an increase from 4.01 lbs/mil for barefoot PP 2252 film. The VISTAMAXX containing films' Puncture Break Energy was 8.32 in-lbs/mil, an increase from 5.30 in-lbs/mil for barefoot PP 2252 film.

A 10% loading of VISTAMAXX 3000 increased the reblock of PP 2252 cast film. The VISTAMAXX containing films' Reblock (I/I) was equal to or greater than 128 g, an increase from 64.7 g for barefoot PP 2252 film.

A 10% loading of VISTAMAXX 3000 increased the softness/feel of PP 2252 cast film. The VISTAMAXX containing films' 1% MD Secant Modulus was 99 Kpsi, a decrease from 125 Kpsi for barefoot PP 2252 film.

A 10% loading of VISTAMAXX 3000 retained the PP 2252 cast films' lifting ability. The VISTAMAXX containing films' MD Tensile at Yield (3.4 Kpsi) is comparable to that of barefoot PP 2252 film (3.9 Kpsi).

A 10% loading of VISTAMAXX 3000 increased the optical/clarity properties of PP 2252 cast film. The VISTAMAXX containing films' haze was 0.84%, a decrease from 3.24% for barefoot PP 2252 film. The VISTAMAXX containing films' gloss was equal to or greater than 88, an increase from less than 80 for barefoot PP 2252 film.

Considering the above, selected monolayer PP 2252 films containing VISTAMAXX 3000 will find utility in press and seal applications. These films reversibly adhered together when placed under pressure without being softened wherein the portions of film being contacted together are part of the same or different VISTAMAXX-PP films and articles.

Figure 2:
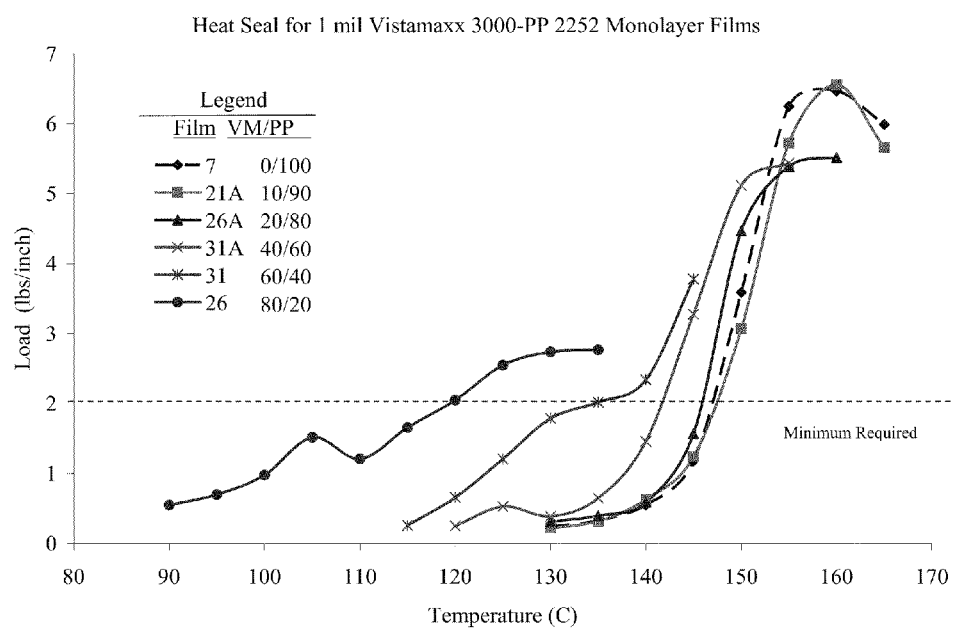
FIG. 2 depicts the heat seal performance of illustrative 1.0 mil monolayer VISTAMAXX 3000/PP 2252 cast films, according to one or more embodiments described.

FIGS. 1 and 2 show the heat seal performance of monolayer cast PP 2252 films containing up to 80% VISTAMAXX 3000. Addition of VISTAMAXX 3000 to PP 2252 film increased the heat seal performance of the film with the increase in seal performance increasing with an increase in the loading of VISTAMAXX 3000. Specifically, VISTAMAXX 3000 widened the seal window of PP 2252 films by lowering the film's heat seal temperature to less than 140° C. from over 155° C. PP 2252 film containing 60% or more VISTAMAXX 3000 (Films 26, 31 and 33) formed breakable seals at temperatures of 135° C. or less. PP 2252 film (Films 7 and 9) formed breakable seals at temperatures greater than 150° C. Films containing less than 60% VISTAMAXX 3000 formed breakable seals at temperatures between 135° C. and 150° C. The films' seal strength exceeded the minimum 2 lbs force required of seals.

FIGS. 1 and 2 also show the monolayer PP 2252 films containing up to 40-50% VISTAMAXX 3000 will find utility in hot fill applications, i.e. packaging materials heated to temperatures up to 260° F. (126° C.) just prior to packaging. These films form breakable seals at higher temperatures (greater than 140° C.) than the temperatures to which products are heated in hot fill applications: 180-260° F. (82-126° C.).

FIGS. 1 and 2 also show the monolayer PP 2252 films containing up to 40-50% VISTAMAXX 3000 will find utility in retort bag applications—pouches, bags and sacks containing products, such as foods, wherein the pouches, bags and sacks containing packaged products are heated to temperatures of about 135° C. for about 15 minutes.

Example 2

The monolayer cast films of Example 2 were made from the resins described in Table 2 using a BLACK CLAWSON cast film line equipped with a 3½" diameter MIGRANDY 30:1 barrier screw (#M22910) equipped with a Koch SMX static mixer and driven by a 150 HP DC motor. It was operated with a screw speed that decreased to 68 rpm from 130 rpm as the VISTAMAXX 3000 content in the film increased from 0% to 90%. The temperature of the melt decreased to 455° F. from 501° F. (to 235° C. from 260° C.) as the VISTAMAXX 3000 content in the film increased from 0% to 90%.

The melt was extruded through a five layer CLOEREN feed block and 42" wide EPOCH 3201 series slot die manufactured by "The Cloeren Company" operated with a 0.020 inch manually adjustable flex die lip. The melt was extruded onto a 36" diameter primary chill roll cored for cooling water circulation and operated with a water inlet temperature of 51-53° F. (11-12° C.). The melt curtain was pinned to the cast roll using an air knife located 4.5 inches from the die and 0.25 inches from the roll. The carriage position was 2.75 inches past vertical, and its height was set at 4. The melt was extruded at a production rate of about 336-401 lbs/hr, which is equivalent to a die throughput rate of 10-12 lbs/hr/inch of die.

Table 5 shows selected physical properties of the films of Example 2. The COF of all the films was greater than 1.

The films of Example 3 were made on a BLACK CLAWSON line equipped with two 3½" diameter screws. The extruder feeding the core layer of the film was equipped with a MIGRANDY 30:1 L/D barrier screw (#M22910) equipped with a Koch SMX static mixer and 150 HP DC drive. The extruder feeding the skin layer of the film was equipped with a Davis Standard (DSBII) 30:1 L/D (serial #XA525904JT) barrier screw equipped with a Koch SMX static mixer and 150 HP DC drive.

The extruder feeding the core layer of the film was operated with a screw speed that increased from 78 rpm to 107 rpm as the PP 2252 core layer increased from 60% to 80% of the film's total thickness. The temperature of the melt increased from 486° F. to 504° F. (252° C. to 262° C.) as the PP 2252 core layer increased from 60% to 80%.

The extruder feeding the skin layer of the film was operated with a screw speed that increased from 12 rpm to 29 rpm as the total skin layer increased from 20% to 40% of the film's total thickness. The temperature of the melt increased from 487° F. to 490° F. (252° C. to 254° C.) as the skin layer decreased from 40% to 20%.

TABLE 5

Physical Properties of Films of Example 2

| Film No. | C-2* | 22A | 28A | 33A | 33 |
|---|---|---|---|---|---|
| VISTAMAXX 3000 | 0 | 10 | 20 | 40 | 60 |
| PP 2252 | 100 | 90 | 80 | 60 | 40 |
| Average Gauge (mil) | 0.54 | 0.79 | 0.49 | 0.59 | 0.50 |
| Haze (%) | 1.1 | 0.8 | 0.4 | 0.2 | 0.3 |
| Gloss 45° MD | 86 | 89 | 90 | 91 | 90 |
| Gloss 45° TD | 87 | 88 | 92 | 92 | 90 |
| Reblock (I/I, grams) | 98 | 162 | 117 | 163 | >214 |
| MD 1% Secant (psi) | 138166 | 105541 | 89074 | 48281 | 27557 |
| TD 1% Secant (psi) | 145785 | 106491 | 88628 | 49004 | 29182 |
| MD Tensile @ Yield (psi) | 4619 | 3510 | 3586 | 2615 | 2247 |
| TD Tensile @ Yield (psi) | 3746 | 3271 | 2889 | 1831 | 1401 |
| MD Tensile @ 200% (psi) | 8284 | 6846 | 9695 | 7733 | 7176 |
| MD Tensile @ 200%/MD Tensile @ Yield Ratio | 2.2 | 2.1 | 3.4 | 4.2 | 5.1 |
| MD Ultimate Tensile (psi) | 18045 | 16154 | 17556 | 16050 | 14138 |
| TD Ultimate Tensile (psi) | 5098 | 6454 | 4248 | 5095 | 5066 |
| MD Break Elongation (%) | 444 | 459 | 371 | 387 | 337 |
| TD Break Elongation (%) | 278 | 840 | 675 | 831 | 864 |
| MD Elmendorf Tear (g) | 8 | 6 | 3 | 3 | 2 |
| TD Elmendorf Tear (g) | 452 | 615 | 317 | 319 | 243 |
| MD Elmendorf Tear (g/mil) | 13 | 8 | 5 | 5 | 4 |
| TD Elmendorf Tear (g/mil) | 779 | 716 | 633 | 559 | 459 |
| Average MD and TD Elmendorf Tear (g/mil) | 396 | 665.5 | 475 | 439 | 351 |
| Dart Drop (g, Method A) | <48 | <48 | <48 | <48 | <48 |
| Dart Drop (g/mil, Method A) | <89 | <61 | <98 | <81 | <96 |
| Peak Puncture Force (lbs) | 3.52 | 3.99 | 2.86 | 3.21 | 2.94 |
| Puncture Break Energy (in-lbs) | 5.05 | 5.85 | 4.35 | 6.07 | 5.97 |
| Peak Puncture Force (lbs/mil) | 6.51 | 5.05 | 5.84 | 5.43 | 5.88 |
| Puncture Break Energy (in-lbs/mil) | 9.35 | 7.41 | 8.88 | 10.29 | 11.93 |
| MD Shrink (%) | 91 | 90 | 90 | 89 | 86 |
| TD Shrink (%) | −49 | −55 | −54 | −59 | −48 |

*Comparative Example

Example 3

The A/B/A co-extruded cast films of Example 3 were made from the resins described in Table 2. In these A/B/A co-extruded cast films, each skin layer ("A") was a blend 60% VISTAMAXX 3000 and 40% PP 2252, or 80% VISTAMAXX 3000 and 20% PP 2252. Each core layer ("B") was PP 2252. Each skin layer ("A") composed 10% or 20% of the overall film thickness. Each core layer ("B") composed 60% to 80% of the overall film thickness.

The melts from the two extruders were combined and extruded through a five layer CLOEREN feed block and 42" wide EPOCH 3201 series slot die manufactured by The Cloeren Company operated with a 0.020 inch manually adjustable flex die lip. The melt was extruded onto a 36" diameter primary chill roll cored for cooling water circulation and operated with a water inlet temperature of 51-53° F. (11-12° C.). The melt curtain was pinned to the cast roll using an air knife located 4.5 inches from the die and 0.25 inches from the roll. The carriage position was 2.75 inches from vertical and its height was set at 4. The melt was extruded at a production rate of about 372-430 lbs/hr, which is equivalent to a die throughput rate of 10-12 lbs/hr/inch of die.

Selected physical properties of the films of Example 3 are presented in Table 6. The COF of all the films exceed one.

taining film's Reblock (I/I) was greater than 214 g, an increase from 64.7 g for barefoot PP 2252 film.

Coextruded PP 2252 films containing VISTAMAXX 3000 in the skins had superior stretch capability to the monolayer

TABLE 6

Physical Properties of Films of Example 3

| | | Layer Distribution | | | | | | |
|---|---|---|---|---|---|---|---|---|
| | | 10/80/10 A/B/A | | | | 20/60/20 A/B/A | | |
| Film No. | | 57 | 18B | 56 | 18 | 19B | 58 | 19 |
| Composition of Skin Layer | | | | | | | | |
| VISTAMAXX 3000 | wt % | 60 | 80 | 60 | 80 | 80 | 60 | 80 |
| PP 2252 | wt % | 40 | 20 | 40 | 20 | 20 | 40 | 20 |
| Film Properties | | | | | | | | |
| Average Gauge (mil) | mil | 0.55 | 0.49 | 1.07 | 1.01 | 0.54 | 0.97 | 0.96 |
| Haze (%) | % | 0.56 | 0.63 | 0.6 | 1.71 | 0.56 | 0.52 | 0.56 |
| Gloss 45° MD | | 90 | 88.6 | 90.2 | 88.8 | 89 | 90.3 | 90.22 |
| Gloss 45° TD | | 89.4 | 866 | 88.8 | 87 | 87.2 | 90.3 | 89.4 |
| Reblock (I/I,) | grams | >214 | >214 | >214 | >214 | >214 | >214 | >214 |
| MD 1% Secant | Psi | 119005 | 126945 | 100684 | 110603 | 98462 | 91871 | 87038 |
| TD 1% Secant | Psi | 121396 | 127821 | 106060 | 108973 | 99389 | 88095 | 89017 |
| MD Tensile @ Yield | Psi | 4061 | 4052 | 3350 | 3327 | 3813 | 2841 | 2765 |
| TD Tensile @ Yield | Psi | 3005 | 3739 | 3032 | 3276 | 2979 | 2589 | 2545 |
| MD Tensile @ 200% | Psi | 7296 | 7434 | 4093 | 3893 | 9197 | 4142 | 3718 |
| MD Tensile @ 200%/ MD Tensile @ Yield ratio | | 1.80 | 1.83 | 1.22 | 1.17 | 3.1 | 1.46 | 1.34 |
| MD Ultimate Tensile | Psi | 151622 | 16721 | 14189 | 13541 | 14980 | 14028 | 13054 |
| TD Ultimate Tensile | Psi | 5210 | 5268 | 7212 | 7121 | 6331 | 6932 | 6769 |
| MD Break Elongation | % | 408 | 453 | 591 | 610 | 328 | 563 | 560 |
| TD Break Elongation | % | 718 | 433 | 841 | 825 | 830 | 862 | 877 |
| MD Elmendorf Tear | grams | 5.2 | 6.5 | 12.3 | 12.2 | 4.7 | 8.9 | 12.6 |
| TD Elmendorf Tear | grams | 528.3 | 390.6 | 1148.2 | 958.4 | 428.6 | 1083.8 | 1039. |
| MD Elmendorf Tear | g/mil | 8.9 | 12 | 11.2 | 11.6 | 9.2 | 8.7 | 11.5 |
| TD Elmendorf Tear | g/mil | 910.9 | 697.4 | 1034.4 | 867.4 | 752 | 1073.1 | 989.6 |
| Average MD & TD Elmendorf Tear | g/mil | 460 | 355 | 523 | 440 | 381 | 541 | 501 |
| Dart Drop (Method A) | grams | <48 | <48 | <48 | <48 | <48 | <48 | 77 |
| Dart Drop (Method A) | g/mil | <87.3 | <98 | <44.9 | <47.5 | <98 | <49.5 | 80.2 |
| Peak Puncture Force | lbs | 3.84 | 4.73 | 5.87 | 7.07 | 5.01 | 5.85 | 7.02 |
| Puncture Break Energy | in-lbs | 5.36 | 9.11 | 10.01 | 13.87 | 9.29 | 11.08 | 15.71 |
| Peak Puncture Force | lbs/mil | 6.98 | 9.65 | 5.48 | 7.00 | 10.42 | 6.03 | 7.32 |
| Puncture Break Energy | in-lbs/mil | 9.75 | 18.60 | 9.36 | 13.74 | 19.30 | 11.42 | 16.37 |
| MD Shrink | % | 89 | 87 | 83 | 81 | 8 | 85 | 80 |
| TD Shrink | % | −50 | −50 | −39 | −36 | −38 | −43 | −36 |

Coextruded cast PP 2252 films containing VISTAMAXX 3000 in the skins had superior toughness, reblock, stretch capabilities and optical/clarity properties to similarly prepared monolayer cast PP 2252 film, while retaining stiffness and lifting ability (compare the properties of Film 7 with those of Films 18, 19, 56, and 58).

Coextruded PP 2252 films containing VISTAMAXX 3000 in the skins had superior toughness to the monolayer PP 2252 films lacking VISTAMAXX 3000. The VISTAMAXX containing films' Dart Drop performance, determined using Method A, was 80.2 g/mil (Film 19), an increase from less than 50 g/mil for barefoot PP 2252 film (Film 7). The VISTAMAXX containing films' tear resistance (Average MD & TD Elmendorf Tear) was 440-541 g/mil, an increase from less than 400 g/mil for barefoot PP 2252 film. The VISTAMAXX containing films' Peak Puncture Force was 5.48-7.32 lbs/mil, an increase from 4.01 lbs/mil for barefoot PP 2252 film. The VISTAMAXX containing films' Puncture Break Energy was 9.36-16.37 in-lbs/mil, an increase from 5.30 in-lbs/mil for barefoot PP 2252 film.

Coextruded PP 2252 films containing VISTAMAXX 3000 in the skins had superior Reblock to the monolayer PP 2252 films lacking VISTAMAXX 3000. The VISTAMAXX con- PP 2252 films lacking VISTAMAXX 3000. The VISTAMAXX containing films' MD Tensile at 200% Elongation to MD Tensile at Yield ratio was 1.17-3.1, an increase from 1.05 for barefoot PP 2252 film.

Coextruded PP 2252 films containing VISTAMAXX 3000 in the skins had superior optical/clarity properties to the monolayer PP 2252 films lacking VISTAMAXX 3000. The VISTAMAXX containing films' haze was 0.52-1.71%, a decrease from 3.24% for barefoot PP 2252 film; and the VISTAMAXX containing film's gloss was greater than 88, an increase from less than 80 for the PP 2252 film.

Coextruded PP 2252 films containing VISTAMAXX 3000 in the skins had superior softness/feel to the monolayer PP 2252 films lacking VISTAMAXX 3000. The VISTAMAXX containing films' 1% MD Secant Modulus (87-110 Kpsi) was less than that of barefoot PP 2252 film (125 Kpsi).

Coextruded PP 2252 films containing VISTAMAXX 3000 in the skins had similar lifting ability to the monolayer PP 2252 films lacking VISTAMAXX 3000. The VISTAMAXX containing films' MD Tensile at Yield (2.8-3.3 Kpsi) was comparable to that of barefoot PP 2252 film (3.4 Kpsi).

Considering the above, selected coextruded PP 2252 films containing VISTAMAXX 3000 will also find utility in press and seal applications. These films will reversibly adhere together when placed under pressure without being softened wherein the portions of film being contacted together are part of the same or different VISTAMAXX-PP films and articles. These films will contain about 30% by weight of the VISTAMAXX 3000 resin in the skins of coextruded PP films.

Figure 3:
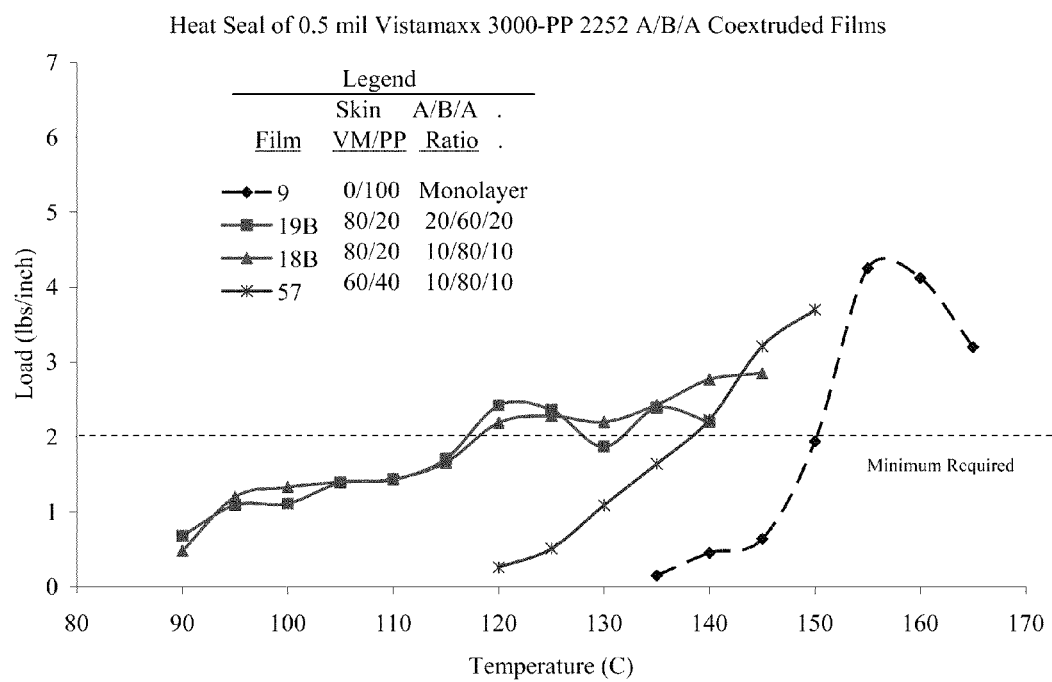
FIG. 3 depicts the seat seal performance of illustrative 0.5 mil coextruded VISTAMAXX 3000/PP 2252 cast films, according to one or more embodiments described.
Figure 4:
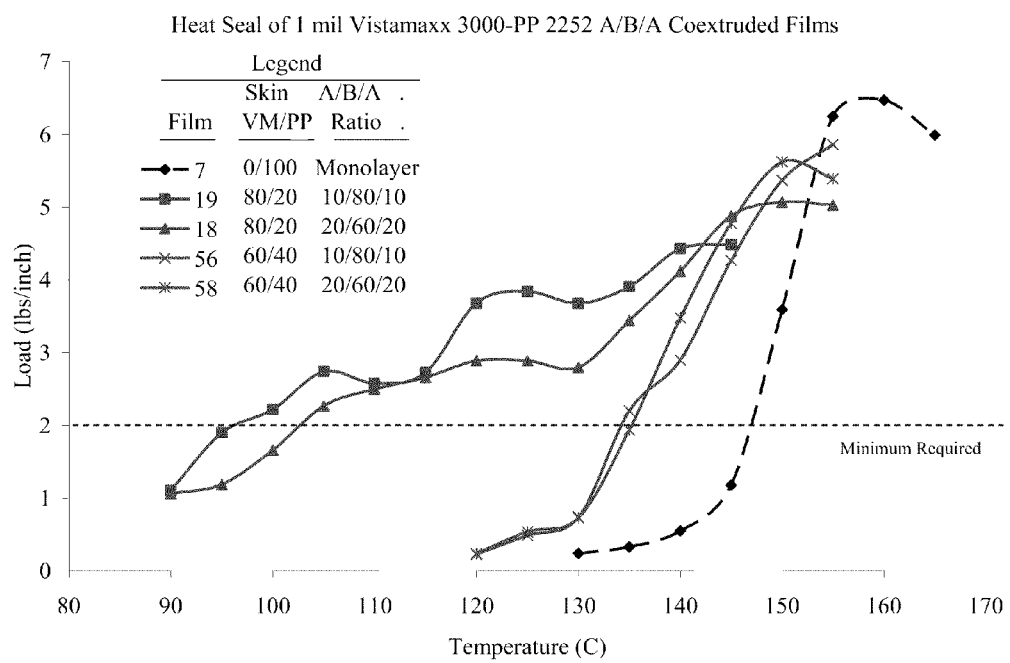
FIG. 4 depicts the heat seal performance of illustrative 1.0 mil coextruded VISTAMAXX 3000/PP 2252 cast films, according to one or more embodiments described.

FIGS. 3 and 4 show the heat seal performance of coextruded cast PP 2252 films containing 60% and 80% VISTAMAXX 3000 in the skins Addition of VISTAMAXX 3000 to the films' skins increased the heat seal performance of the film with the increase in seal performance increasing with an increase in the loading of VISTAMAXX 3000. Specifically, VISTAMAXX 3000 widened the seal window of PP 2252 films by lowering the films' heat seal temperature to less than 140° C. from over 155° C. For example, films containing 60% or more VISTAMAXX 3000 in the skins (Films 18, 18A, 19, 19B, 56, 57, 58) formed breakable seals at temperatures of 135° C. or less, while PP 2252 films (Films 7 and 9) formed breakable seals at temperatures greater than 150° C. Films containing less than 60% VISTAMAXX 3000 in the skins formed breakable seals at temperatures between 135° C. and 150° C. The films' seal strength exceeded the minimum 2 lbs force required of seals.

FIGS. 3 and 4 also show the coextruded PP 2252 films containing up to about 40-50% VISTAMAXX 3000 in the skins will find utility in hot fill applications—packaging materials heated to temperatures up to 260° F. (126° C.) just prior to packaging. These films form breakable seals at higher temperatures (greater than 140° C.) than the temperatures to which products are heated in hot fill applications: 180-260° F. (82-126° C.).

FIGS. 3 and 4 also show the coextruded PP 2252 films containing up to 40-50% VISTAMAXX 3000 in the skins will find utility in retort bag applications, such as pouches, bags and sacks containing products like foods, wherein the pouches, bags and sacks containing packaged products are heated to temperatures of about 135° C. for about 15 minutes.

Table 5 shows the tear and puncture resistances of coextruded cast films containing VISTAMAXX 3000 were unexpectedly greater than those of monolayer films containing similar loadings of VISTAMAXX 3000.

The tear resistance (Average MD/TD Elmendorf Tear) of the coextruded films was 440-541 g/mil, while that of the monolayer films was 430-460 g/mil.

The Peak Puncture Force of the coextruded films was 5.48-7.32 lbs/mil, while that of the monolayer films was 4.42-5.01 in-lbs.

The Puncture Break Energy of the coextruded films was 9.36-16.37 in-lbs/mil, while that of the monolayer films was 7.61-8.42 in-lbs/mil.

The stiffness, strength and stretch capability of the monolayer and coextruded films were similar.

Example 4

The A/B/A co-extruded blown films of Example 4 were made from the resins described in Table 3. These A/B/A coextruded blown films were prepared using a $2^3$ factorial Design of Experiments employing two die gaps and two propylene-based copolymers at two loadings in the core layer. The core layer constituted about 50% of the film by weight. The core layer contained 15% or 25% of either VISTAMAXX 3000 or 6100, and 75% or 85% PP 4352F1. The skin layer contained 10% of either VISTAMAXX 3000 or 6100, 10% LD 150BW and 80% EXCEED 1018CA. The VISTAMAXX in the core layer matched the VISTAMAXX in the skin layer. In each film, the propylene-based copolymer in both the core and skin of a film were the same. Each film was 4 mil.

The films of Example 4 were made on ETC's Windmöller & Hölscher 3-layer coextrusion blown film line operated at 200 kg/hr (440 lbs/hr) using a 2.5 Blow-Up Ratio. The W&H line was equipped with one 3½" (90 mm) diameter extruder and two 2.3" (60 mm) diameter extruders. The extruder feeding the core of the film [the 3½" (90 mm) diameter extruder] was equipped with a grooved feed screw. The extruder feeding one skin layer of the film [one of the 2.3" (60 mm) diameter extruders] was equipped with a smooth bored screw. The extruder feeding the other skin layer of the film [the other 2.3" (60 mm) diameter extruder] was equipped with a grooved feed screw.

The extruder feeding the core layer of the film was operated with an average screw speed of 30 RPM. The average melt temperature was 422° F. (217° C.). The extruders' Specific Output was 7.3 lbs/hr/RPM (3.3 Kg/hr/rpm).

The smooth bored extruder feeding one skin layer of the film was operated with an average screw speed of 54 RPM. The average melt temperature was 428° F. (220° C.). The extruders' Specific Output was 2.0 lbs/hr/RPM (0.9 Kg/hr/rpm).

The grooved feed extruder feeding one skin layer of the film was operated with an average screw speed of 58 RPM. The average melt temperature was 428° F. (220° C.). The extruders' Specific Output was 2.0 lbs/hr/RPM (0.9 Kg/hr/rpm).

The combined melts were extruded through 160 mm (6.3 inch) and 250 mm (9.84 inch) three layer spiral mandrel dies equipped with dual lip air rings. The 160 mm (6.3 inch) die was equipped with a 1.4 mm parallel die gap. The 250 mm (9.84 inch) die was equipped with a 2.2 mm HQ die gap (this die gap was 1.2 mm wide at the die exit to 2.2 mm at the die entrance especially designed to prevent melt fracture). The melt was extruded at a die throughput rate of 2.4-4.0 Kg/hr/cm of die (14-22 lbs/hr/inch of die).

Table 7 shows selected physical properties of the films of Example 4. Table 7 also shows, for comparative purposes, selected physical properties of 4 mil film used around the world to make tubular form fill and seal sack film.

TABLE 7

Physical Properties of the Films of Example 4

| Run Number | | 1 | 2 | 3 | 4 | 5 | 6 | 7 | 8 | Average Performance of Global Heavy Duty Sacks | |
|---|---|---|---|---|---|---|---|---|---|---|---|
| | | | | | | | | | | General Utility | High Performance |
| PP 4352F1 | % | 85 | 75 | 85 | 75 | 85 | 75 | 85 | 75 | | |
| VISTAMAXX 3000 | % | 15 | 25 | — | — | 15 | 25 | — | — | | |

TABLE 7-continued

Physical Properties of the Films of Example 4

| Run Number | | 1 | 2 | 3 | 4 | 5 | 6 | 7 | 8 | Average Performance of Global Heavy Duty Sacks | |
|---|---|---|---|---|---|---|---|---|---|---|---|
| | | | | | | | | | | General Utility | High Performance |
| VISTAMAXX 6100 | % | — | — | 15 | 25 | — | — | 15 | 25 | | |
| 1.4 mm parallel die gap | | Yes | Yes | Yes | Yes | — | — | — | — | | |
| 1.2-2.5 mm HQ die gap. | | — | — | — | — | Yes | Yes | Yes | Yes | | |
| Average Gauge | mil | 3.99 | 3.99 | 3.97 | 3.89 | 3.97 | 3.94 | 3.94 | 3.93 | 4 | 4 |
| Haze | % | 12.9 | 12.5 | 11.8 | 11.9 | 12.6 | 12.0 | 12.6 | 10.7 | | |
| Gloss 45° MD | | 71.4 | 70.5 | 71.8 | 69.7 | 71.2 | 70.1 | 69.6 | 70.7 | | |
| Gloss 45° TD | | 73.0 | 72.0 | 72.3 | 70.8 | 72.9 | 71.8 | 71.2 | 72.3 | | |
| MD 1% Secant | psi | 79216 | 60864 | 83492 | 62542 | 78942 | 62382 | 83044 | 64715 | 54800 | 69500 |
| TD 1% Secant | Psi | 82501 | 61834 | 79104 | 59482 | 80824 | 63494 | 79904 | 61373 | | |
| MD Tensile @ Yield | Psi | 2937 | 2598 | 2870 | 2158 | 2992 | 2548 | 2849 | 2259 | 2800 | 2800 |
| TD Tensile @ Yield | Psi | 3005 | 2563 | 2722 | 2283 | 2910 | 2506 | 2831 | 2186 | 2900 | 3100 |
| MD Tensile @ 200% | Psi | 2739 | 2553 | 2718 | 2477 | 2767 | 2576 | 2684 | 2532 | | |
| MD Ultimate Tensile | Psi | 7496 | 7328 | 7542 | 7497 | 7555 | 7527 | 7638 | 7768 | | |
| TD Ultimate Tensile | Psi | 5835 | 5839 | 5834 | 6092 | 6015 | 6027 | 5799 | 6116 | | |
| MD Break Elongation | % | 761 | 760 | 751 | 758 | 761 | 767 | 751 | 756 | | |
| TD Break Elongation | % | 721 | 729 | 725 | 742 | 717 | 745 | 707 | 727 | | |
| MD Elmendorf Tear | g | 99 | 254 | 180 | 307 | 124 | 248 | 188 | 292 | | |
| TD Elmendorf Tear | g | 1231 | 1470 | 924 | 973 | 1377 | 1517 | 987 | 987 | | |
| MD Elmendorf Tear | g/mil | 32 | 65 | 45 | 78 | 31 | 62 | 47 | 74 | 142 | 325 |
| TD Elmendorf Tear | g/mil | 314 | 366 | 236 | 248 | 350 | 381 | 252 | 250 | | |
| Average Elmendorf Tear | g/mil | 173 | 215 | 140 | 163 | 191 | 222 | 149 | 162 | | |
| Dart Drop (Method A) | g | 540 | 522 | 552 | 594 | 546 | 552 | 558 | 594 | 570 | 820 |
| Dart Drop (Method A) | g/mil | 135 | 131 | 139 | 153 | 138 | 140 | 142 | 151 | | |
| Peak Puncture Force | lbs | 28.3 | 28.3 | 39.7 | 28.0 | 31.3 | 30.4 | 30.5 | 27.0 | 38 | 42 |
| Puncture Break Energy | in-lbs | 61.9 | 64.0 | 66.1 | 62.7 | 72.8 | 73.3 | 69.8 | 61.0 | 58 | 93 |
| Peak Puncture Force | lbs/mil | 7.1 | 7.1 | 7.5 | 7.2 | 7.9 | 7.7 | 7.7 | 10.9 | | |
| Puncture Break Energy | in-lbs/mil | 15.5 | 16.0 | 16.7 | 16.1 | 18.3 | 18.6 | 17.8 | 24.7 | | |
| MD Shrink | % | 60 | 57 | 58 | 60 | 62 | 62 | 62 | 61 | | |
| TD Shrink | % | −6 | −7 | −5 | −8 | −11 | −13 | −9 | −9 | | |

Table 7 shows the coextruded blown films containing VISTAMAXX resins had good impact resistance, puncture resistance, stiffness, load bearing capability and ultimate tensile performance, with adequate tear resistance.

The 4 mil VISTAMAXX containing PP 4352F blown film had good impact resistance. The Dart Drop of the 4 mil VISTAMAXX containing film was 131-153 g/min, an increase from less than 50 g/mil for the 1 mil monolayer VISTAMAXX-PP 2252 cast film.

The 4 mil VISTAMAXX containing PP 4352F blown film had good puncture resistance. The Peak Puncture Force of the 4 mil VISTAMAXX containing film was 7.1-10.9 in-lbs, an increase from 6 in-lbs for the 1 mil monolayer VISTAMAXX-PP 2252 cast film; and the Puncture Break Energy of the 4 mil VISTAMAXX containing film was 15.5-24.7 in-lbs/mil, an increase from 5.3 in-lbs for the 1 mil monolayer VISTAMAXX-PP 2252 cast film.

The 4 mil VISTAMAXX containing PP 4352F blown film has good lifting ability. The MD Tensile @ Yield of the 4 mil VISTAMAXX containing blown film (2.2-3.0 Kpsi) was comparable than that for the 1 mil monolayer VISTAMAXX-PP 2252 cast film (3.4 Kpsi). The TD Tensile @ Yield of the 4 mil VISTAMAXX containing film (2.2-3.0 Kpsi) was comparable than that for the 1 mil monolayer VISTAMAXX-PP 2252 cast film (3.8 Kpsi).

The 4 mil VISTAMAXX containing PP 4352F blown film had good softness/feel. The 1% MD Secant Modulus of the 4 mil VISTAMAXX containing blown film was 65-83 Kpsi, a decrease from 125 Kpsi for the 1 mil monolayer VISTAMAXX-PP 2252 cast film.

The 4 mil VISTAMAXX containing PP 4352F blown film had good tear resistance. The Average Elmendorf Tear (MD and TD Average) of the 4 mil VISTAMAXX containing film was 140-222 g/min.

Table 7 also shows VISTAMAXX containing blown film will find utility in heavy-duty sack applications. The film will contain about 15% by weight of VISTAMAXX 3000 in PP cores, have sealable skins and be made using smaller dies equipped with wide die gaps.

The average Elmendorf Tear (MD and TD Average) of 4 mil VISTAMAXX 3000 blown film containing a 25% loading of VISTAMAXX 3000 in the PP 4352F core (215-222 g/mil) was comparable to that of the MD Elmendorf Tear of 4 mil General Utility sack film (142 g/mil), but less than the MD Elmendorf Tear of 4 mil High Performance Heavy-duty sack film (325 g/mil). Similarly, the average Elmendorf Tear of the 4 mil VISTAMAXX 3000 blown film containing a 15% loading of VISTAMAXX 3000 in the PP 4352F core (173-191 g/mil) was comparable to that of 4 mil General Utility sack film. The average Elmendorf Tear of the 4 mil VISTAMAXX 6100 blown film containing a 15% loading of VISTAMAXX 6100 in the PP 4352F core (140-149 g/mil) was comparable to that of 4 mil General Utility sack film.

The Dart Drop of 4 mil VISTAMAXX containing blown film (540-590 g) was comparable to that of 4 mil General Utility sack film (570 g), but less than that for 4 mil High Performance Heavy-duty sack film (820 g).

The Peak Puncture Force of the 4 mil VISTAMAXX containing blown film (27-39 lbs) was comparable to that of 4 mil General Utility sack film (38 lbs), but slightly less than that of 4 mil High Performance Heavy-duty sack film (42 lbs).

The Puncture Break Energy of the 4 mil VISTAMAXX containing blown film (61-73 in-lbs) is greater than that of 4 mil General Utility sack film (58 in-lbs), but less than that of 4 mil High Performance Heavy-duty sack film (93 in-lbs).

The 1% MD Secant Modulus of the 4 mil VISTAMAXX containing blown film (65-83 Kpsi) was greater than that of 4 mil General Utility Heavy-duty sack film (54.8 Kpsi) and comparable to or greater than that of 4 mil High Performance Heavy-duty sack film (69.5 Kpsi), with the VISTAMAXX 6100 containing film being slightly stiffer and the stiffness of the VISTAMAXX containing film decreasing with an increase in the loading of the VISTAMAXX resin.

The MD Tensile @ Yield of the 4 mil VISTAMAXX containing blown film (2.2-3.0 Kpsi) was comparable to that of both 4 mil General Utility and High Performance Heavy-duty sack film (2.8 Kpsi), with the VISTAMAXX 3000 containing film being slightly stronger—able to lift more weight—and the strength of the VISTAMAXX containing film decreases with an increase in the loading of the VISTAMAXX resin.

The TD Tensile @ Yield of the 4 mil VISTAMAXX containing blown film (2.2-3.0 Kpsi) was comparable to that of both 4 mil General Utility and High Performance Heavy-duty sack film (2.9-3.1 Kpsi), with the VISTAMAXX containing film being slightly stronger—more creep resistant—and the strength of the VISTAMAXX containing film decreases with an increase in the loading of the VISTAMAXX resin.

The present invention further relates to:

1. A film comprising about 10 to about 80 weight percent of a propylene-based copolymer having at least 50 wt % propylene-derived units and 5 wt % to 30 wt % alpha-olefin comonomer, based on the total weight of the polymer. The copolymer has a melting point of from about 100° C. to about 170° C., and a melt flow rate of about 200 dg/min or less, as measured according to ASTM D1238-94. The film can also include about 20 wt % to about 90 wt % of a polypropylene homopolymer having a melting point of from about 140° C. to about 190° C. Preferably, the film has a thickness of about 10 μm to about 100 μm, a haze of 13% or less, as measured according to ASTM D1003-95, a 1% MD Secant tensile modulus of 55,000 to 150,000 psi, as measured according to ASTM D882-95a, an Elmendorf tear in the machine direction of at least 5 g/mil, as measured according to ASTM D1922-94, an Elmendorf tear in the transverse direction of at least 300 g/mil, as measured according to ASTM D1922-94, and a 45 degree gloss of at least 70, as measured according to ASTM D2457-90.

2. The film according to paragraph 1, wherein the propylene based copolymer comprises 75 wt % to about 96 wt % propylene, and from about 4 to 25 wt % ethylene.

3. The film according to paragraphs 1 or 2, wherein the propylene based copolymer has a density of 0.850 g/cm$^3$ to 0.920 g/cm$^3$.

4. The film according to any of paragraphs 1 to 3, wherein the propylene based copolymer has a melting point of 110° C. to 160° C.

5. The film according to any of paragraphs 1 to 4, wherein the propylene based copolymer has a MFR in of 2 dg/min to 100 dg/min.

6. The film according to any of paragraphs 1 to 5, wherein the film comprises 60 wt % to 98 wt % of the propylene-based copolymer, based on total weight of the film.

7. The film according to any of paragraphs 1 to 6, wherein the propylene-based copolymer comprises 82 wt % to 93 wt % of units derived from propylene and from about 7 wt % to 18 wt % of units derived from ethylene.

8. The film according to any of paragraphs 1 to 7, wherein the film is a blown film.

9. The film according to any of paragraphs 1 to 8, wherein the film is a cast film.

10. The film according to any of paragraphs 1 to 9, wherein the film is a monolayer film.

11. A thermoplastic composition for cast and blown films, comprising about 10 wt % to about 90 wt % of a propylene-based copolymer having at least 50 wt % propylene-derived units and of from 5 wt % to 25 wt % ethylene, based on the total weight of the copolymer. The copolymer has a melt flow ratio of about 7 g/10 min to 8 g/10 min (ASTM 1238D, 2.16 kg, 230° C.), a density of about 0.850 g/cm$^3$ to about 0.880 g/cm$^3$, a heat of fusion of about 21.4 J/g to about 28.8 J/g, and a melting point of about 56° C. to about 65° C. The thermoplastic composition further includes about 20 wt % to about 90 wt % of a polypropylene homopolymer having a melt flow rate of about 2.9 g/10 min to 4.5 g/10 min (2.16 kg, 230° C.), a density of about 0.920 to about 0.970 g/cm$^3$, and a melting point of about 120° C. to about 170° C.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A film, comprising:
    about 10 wt % to about 80 wt % of a propylene-based copolymer having at least 50 wt % propylene-derived units and 5 wt % to 30 wt % alpha-olefin comonomer, based on the total weight of the polymer, said copolymer having a melting point of from about 100° C. to about 170° C., and a melt flow rate of about 200 dg/min or less, as measured according to ASTM D1238-94; and
    about 20 wt % to about 90 wt % of a polypropylene homopolymer having a melting point of from about 140° C. to about 190° C. and a density of about 0.920 to about 0.970 g/cm$^3$,
    wherein the film has:
        a thickness of about 10 µm to about 75 µm;
        a haze of 13% or less, as measured according to ASTM D1003-95;
        a 1% MD Secant tensile modulus of 55,000 to 150,000 psi, as measured according to ASTM D882-95a;
        an Elmendorf tear in the machine direction of at least 5 g/mil, as measured according to ASTM D1922-94;
        an Elmendorf tear in the transverse direction of at least 300 g/mil, as measured according to ASTM D1922-94; and
        a 45 degree gloss of at least 70, as measured according to ASTM D2457-90.

2. The film of claim 1, wherein the propylene based copolymer comprises 75 wt % to about 96 wt % propylene, and from about 4 to 25 wt % ethylene.

3. The film of claim 1, wherein the propylene based copolymer has a density of 0.850 g/cm$^3$ to 0.920 g/cm$^3$.

4. The film of claim 1, wherein the propylene based copolymer has a melting point of 110° C. to 160° C.

5. The film of claim 1, wherein the propylene based copolymer has a MFR in of 2 dg/min to 100 dg/min.

6. The film of claim 1, wherein the film comprises 60 wt % to 80 wt % of the propylene-based copolymer, based on total weight of the film.

7. The film of claim 1, wherein the propylene-based copolymer comprises 82 wt % to 93 wt % of units derived from propylene and from about 7 wt % to 18 wt % of units derived from ethylene.

8. The film of claim 1, wherein the film is a blown film.

9. The film of claim 1, wherein the film is a cast film.

10. The film of claim 1, wherein the film is a monolayer film.

11. A thermoplastic composition for cast and blown films, comprising:
    about 10 wt % to about 90 wt % of a propylene-based copolymer having at least 50 wt % propylene-derived units and of from 5 wt % to 25 wt % ethylene, based on the total weight of the copolymer, the copolymer having:
        a melt flow rate of about 7 g/10 min to 8 g/10 min (ASTM 1238D, 2.16 kg, 230° C.);
        a density of about 0.850 g/cm$^3$ to about 0.880 g/cm$^3$;
        a heat of fusion of about 21.4 J/g to about 28.8 J/g;
        a melting point of about 56° C. to about 65° C.; and
    about 20 wt % to about 90 wt % of a polypropylene homopolymer having:
        a melt flow rate of about 2.9 g/10 min to 4.5 g/10 min (2.16 kg, 230° C.);
        a density of about 0.920 to about 0.970 g/cm$^3$; and
        a melting point of about 140° C. to about 170° C.

* * * * *